(12) United States Patent  
Kovalevsky et al.

(10) Patent No.: US 12,253,171 B2  
(45) Date of Patent: Mar. 18, 2025

(54) END BOSS FOR TYPE IV PRESSURE VESSEL

(71) Applicant: Linamar Corporation, Guelph (CA)

(72) Inventors: Vladimir Kovalevsky, Rantigny (FR); Jordan Sanches, San Francisco, CA (US)

(73) Assignee: Linamar Corporation, Guelph (CA)

( * ) Notice: Subject to any disclaimer, the term of this patent is extended or adjusted under 35 U.S.C. 154(b) by 287 days.

(21) Appl. No.: 17/623,381

(22) PCT Filed: Jun. 29, 2020

(86) PCT No.: PCT/US2020/070213  
§ 371 (c)(1),  
(2) Date: Dec. 28, 2021

(87) PCT Pub. No.: WO2020/264585  
PCT Pub. Date: Dec. 30, 2020

(65) Prior Publication Data  
US 2022/0373085 A1 Nov. 24, 2022

Related U.S. Application Data

(60) Provisional application No. 62/867,910, filed on Jun. 28, 2019.

(51) Int. Cl.  
*F17C 1/02* (2006.01)  
*F16J 12/00* (2006.01)  
*F17C 1/06* (2006.01)

(52) U.S. Cl.  
CPC ............... *F16J 12/00* (2013.01); *F17C 1/06* (2013.01); *F17C 2201/0109* (2013.01); *F17C 2203/066* (2013.01); *F17C 2223/036* (2013.01)

(58) Field of Classification Search  
CPC ..... F16J 12/00; F17C 1/06; F17C 2201/0109; F17C 2203/066; F17C 2223/036  
(Continued)

(56) References Cited

U.S. PATENT DOCUMENTS 3,765,557 A * 10/1973 Giwer ................... B29C 53/602  
220/560.04  
6,135,308 A 10/2000 Fang  
(Continued)

FOREIGN PATENT DOCUMENTS

JP 10332084 A2 12/1998  
JP 2010-266029 A2 11/2010  
(Continued)

OTHER PUBLICATIONS

Reasons of Rejection from Japanese patent office for JP2021-577417 mailed Jul. 5, 2024.

*Primary Examiner* — Don M Anderson  
*Assistant Examiner* — Elizabeth J Volz  
(74) *Attorney, Agent, or Firm* — Miller Canfield

(57) ABSTRACT

A type IV conformable pressure vessel has improved mechanical coupling between an outer composite shell and a boss. The pressure vessel comprises an inner polymeric liner having a flare edge fixedly coupled to the boss. The boss has a bore in fluid communication with an interior of the pressure vessel. In addition, the boss has a shank extending between the liner and the outer composite shell. The shank includes a plurality of spikes projecting radially away from the boss. The outer composite shell of resin and fiber surrounds an outer periphery of the liner and an outer periphery of the shank. The spikes are embedded into the outer composite shell to mechanically fasten the outer composite shell to the boss.

27 Claims, 20 Drawing Sheets

(58) Field of Classification Search
USPC .......................................................... 220/586
See application file for complete search history.

(56) References Cited

U.S. PATENT DOCUMENTS

| | | | |
|---|---|---|---|
| 8,397,938 B2 * | 3/2013 | Strack | F16J 12/00 |
| | | | 220/582 |
| 8,733,571 B2 | 5/2014 | Olson | |
| 9,683,698 B2 | 6/2017 | Uchida et al. | |
| 2011/0304083 A1 * | 12/2011 | Strack | B29C 45/14467 |
| | | | 425/523 |
| 2017/0336031 A1 | 11/2017 | Newhouse | |

FOREIGN PATENT DOCUMENTS

| | | |
|---|---|---|
| JP | 2018-519480 A | 7/2018 |
| WO | 2020002467 | 1/2020 |

\* cited by examiner

END BOSS FOR TYPE IV PRESSURE VESSEL

CROSS-REFERENCE TO RELATED APPLICATIONS

This application claims priority to U.S. Provisional Application No. 62/867,910, filed on Jun. 28, 2019.

BACKGROUND OF THE INVENTION

1. Field of the Invention

The present invention relates to a boss for Type IV pressure vessels including Type IV conformable pressure vessels. More particularly, the invention relates to boss designs having spikes embedded into an outer composite shell and wherein the liner is positioned inside of the boss.

2. Description of Related Art

Pressure vessels commonly store fluids and/or gases under pressure, such as natural gas, oxygen, nitrogen, hydrogen, propane, and the like. Type IV pressure vessels or tanks have a metal-free body typically comprising a carbon fiber reinforced polymer composite wound and/or braided over a thermoplastic polymeric liner. A valve is coupled to the vessel for filling the vessel with compressed fluid. However, the valve cannot be connected directly to the polymer liner. Therefore, a boss needs to be provided to couple the valve to the vessel.

A first known method of forming a type IV pressure vessel by attaching a boss to a polymeric liner and an outer composite shell is illustrated in U.S. Pat. No. 10,180,210. The first known method utilizes an injection molding process to mold the liner around locking features of the boss to mechanically lock the boss to the liner. This first known method provides excellent surface contact between the polymeric liner and the outer surface of the boss. A seal between the liner and the boss is Ruined by an interface between the liner and the boss. Further, the boss typically includes a lip feature that seals against itself when the boss is pressurized. The gas-tight boss/liner assembly is supported by an outer covering of a composite shell. The sealing mechanism and the mechanical restriction are not coupled. The joint between the boss and the liner is not pre-stressed.

However, this first known method requires molding the liner around the boss prior to wrapping the liner with the composite fibers. Further, the first known method lacks mechanical engagement between the boss and the outer composite shell. As such, the boss can separate from the outer composite shell under stress, allowing the boss to rotate within the outer composite shell and/or slide axially with respect to the outer composite shell. Movement of the boss with respect to the liner and/or the outer composite shell can result in leakage and potentially failure of the connection between the boss and the pressure vessel.

A second known method of forming a boss of a type IV pressure vessel is illustrated in U. S. publication No. 2018/283612, wherein a hose-style crimp, such as a ferrule, is crimped around a layered assembly of an outer composite shell, a polymeric liner, and a boss-. The second known method includes a boss that slides within an opening in the liner such that the liner is positioned against an outer surface of the boss. A ferrule is crimped around the boss and the composite shell after the liner is covered with the outer composite shell to fixedly couple the boss to the outer composite shell. The boss can include ridges along an outer surface of the boss to grip an inner surface of the liner. The hose-style crimp fittings rely on crimp pressure to provide composite anchoring and sealing. Gas trying to escape along the liner tends to open a gap between the boss and the liner. The ferrule and the composite are pre-stressed to a state resisting the gap opening. The ferrule is also stressed axially by providing grip on the composite and resisting the stem axial displacement.

However, this second known method relies on the crimp pressure to fixedly couple the boss to the liner. The boss can rotate within the liner under increased load on the boss if there is insufficient crimping force on the joint between the boss and the liner. Further, the second known method lacks mechanical engagement directly between the boss and the outer composite shell and relies on the ferrule to fixedly couple the boss to the outer composite shell. Axial load and rotational load on the boss can weaken the connection between the boss and the outer composite shell. The boss can separate from the outer composite shell under stress, allowing the boss to rotate within the outer composite shell and/or slide axially with respect to the outer composite shell. Movement of the boss with respect to the liner and/or the outer composite shell can result in leakage and potentially failure of the connection between the boss and the pressure vessel.

It is desirable, therefore, to mechanically couple a boss directly to an outer composite shell of a type IV pressure vessel. Further, it is desirable to mechanically couple the boss directly to a liner of the pressure vessel. It is desirable to form a seal between the liner and the boss. It is also desirable to restrict rotational movement of the boss with respect to the liner and with respect to the outer composite when torque is applied to the boss. Further, it is desirable to restrict axial movement of the boss with respect to the liner and to the outer composite shell when axial force is applied to the boss. In addition, it is desirable to fixedly couple the liner to the boss without using a molding process and without requiring the use of a ferrule to crimp the liner to the boss. Finally, it is desirable to fixedly couple the outer composite shell to the boss without relying on a ferrule to crimp the outer composite shell to the boss.

SUMMARY OF THE INVENTION

A type IV pressure vessel is provided that has improved mechanical coupling between an outer composite shell and a boss. The pressure vessel comprises an inner polymeric liner having a flare edge fixedly coupled to the boss. The boss has a bore in fluid communication with an interior of the pressure vessel. In addition, the boss has a shank extending between the liner and the outer composite shell. The shank includes a plurality of spikes projecting radially away from the boss. The outer composite shell of resin and fiber surrounds an outer periphery of the liner and an outer periphery of the shank. The spikes are embedded into the outer composite shell to mechanically fasten the outer composite shell to the boss.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
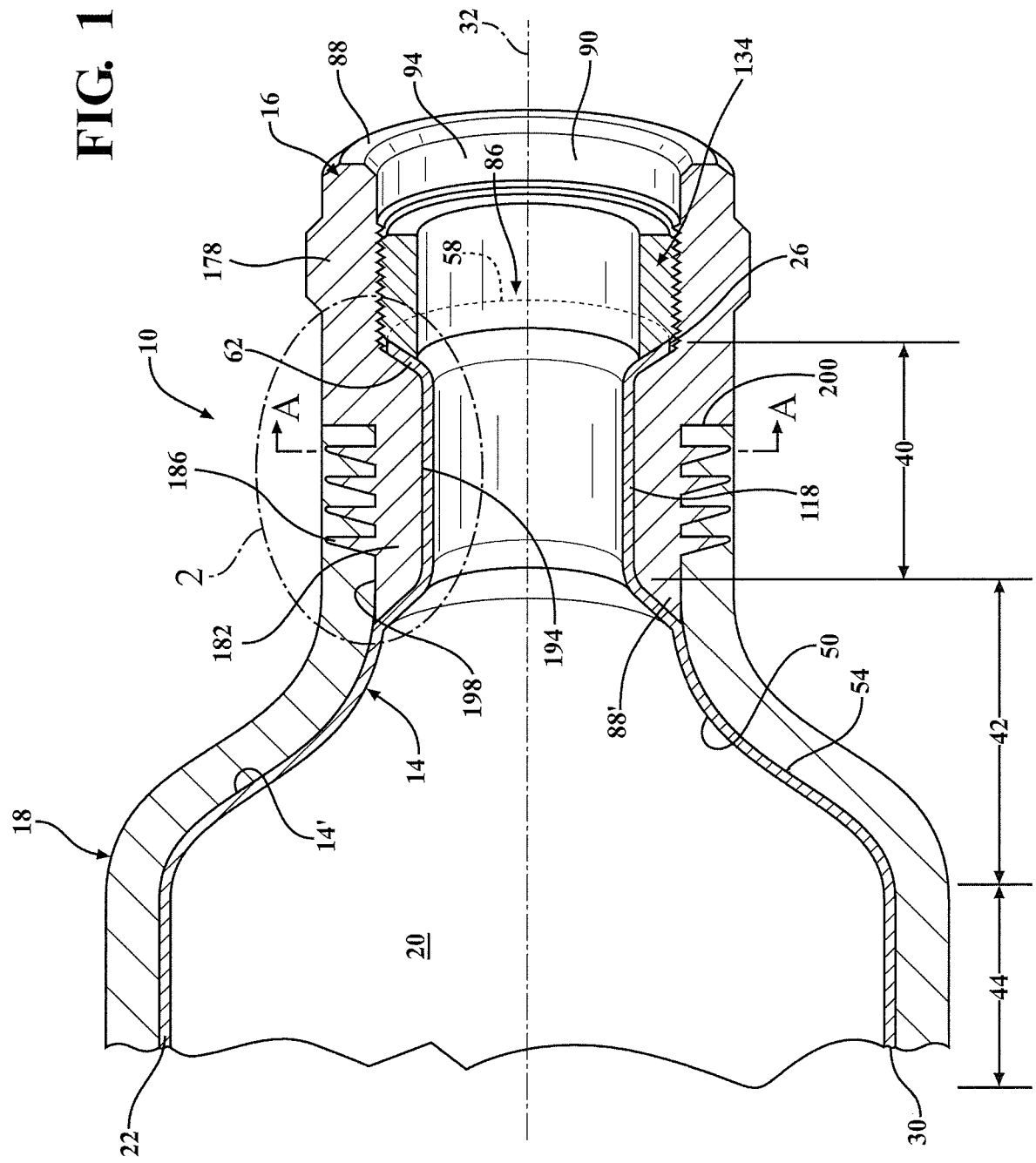
FIG. 1 is a cross-sectional view of a portion of a type IV pressure vessel having a boss assembled between a polymeric liner and an outer composite shell, according to one embodiment of the present invention.
Figure 2:
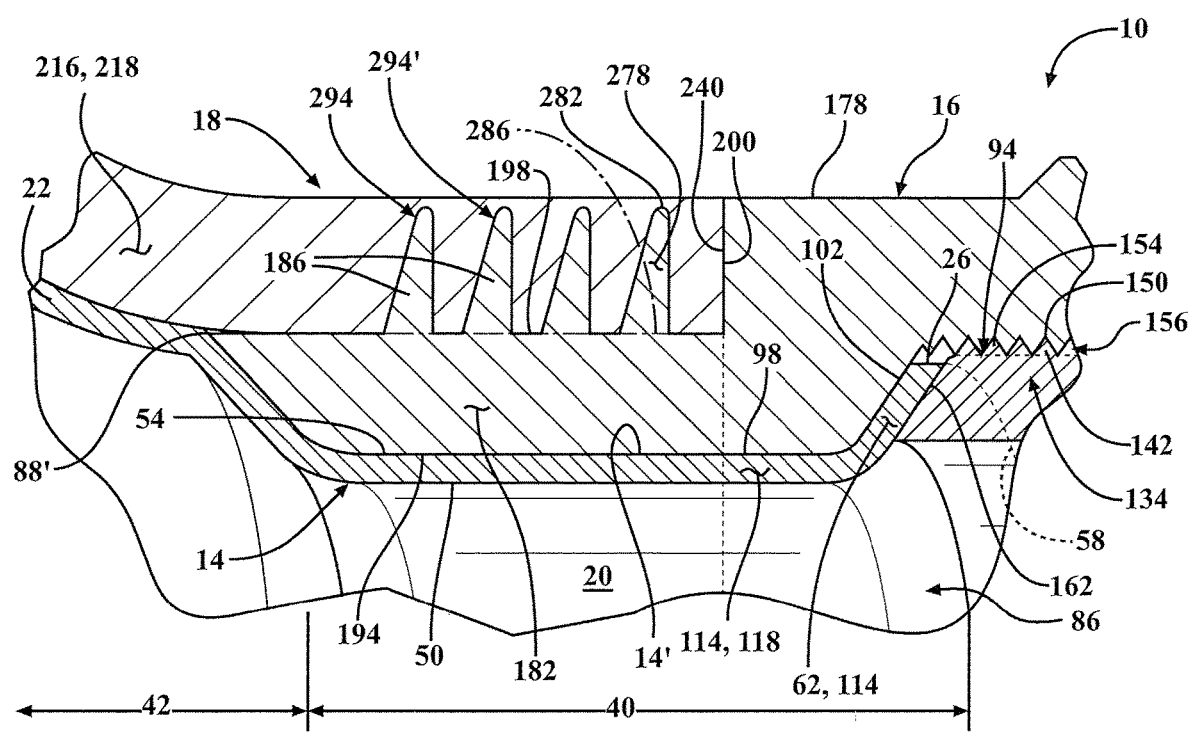
FIG. 2 is an enlarged cross-sectional view of portion 2 of the pressure vessel of FIG. 1, illustrating spikes projecting from the boss and embedded into the outer composite shell and illustrating a sealing insert compressing the liner flared section against the boss.

Referring to the Figures, wherein like numerals indicate like or corresponding parts throughout the several views, a type IV pressure vessel (with polymeric liner 14 and outer composite shell 18) 10 for containing liquids and/or gases under pressure is shown in FIGS. 1 and 2, according to one embodiment of the present invention. The pressure vessel 10 is suitable for storage of compressed liquids and/or gases, such as nitrogen, hydrogen, natural gas, helium, dimethyl ether, liquefied petroleum gas, xenon, and the like. A pressure vessel 10 for storage of hydrogen for automotive applications typically is designed for up to 70 MPa of nominal working pressure. In comparison, pressure vessels 10 for storage of compressed natural gas are typically designed for up to 25 MPa of nominal working pressure.

Referring to FIGS. 1 and 2, the pressure vessel 10 includes a polymeric liner 14 fixedly coupled to a boss 16 with an outer composite shell 18 surrounding an outer periphery 14' of the polymeric liner 14. The liner 14 comprises an interior hollow body 20 defined by an elongated cylindrical wall 22 extending between a first terminal end 26 and a second terminal end 30. The longitudinal axis of the pressure vessel 10 is shown by element 32. In the embodiment shown in FIG. 1, the liner 14 includes a neck region 40, a taper region 42, and a chamber region 44. The polymeric liner 14 includes opposing inner and outer surfaces 50, 54 and an inlet opening 58 at the first terminal end 26. The inlet opening 58 of the liner 14 includes a flare edge 62 that is fixedly coupled to the boss 16 with the sealing insert 134.

The polymeric liner 14, shown in FIG. 1, is generally formed from one or more polymeric materials such as Nylon (PA), ethylene-vinyl acetate (EVA), linear low-density polyethylene (LLDPE), low-density polyethylene (LDPE), high-density polyethylene (HDPE), polypropylene (PP), ethylene vinyl alcohol (EVOH), polytetrafluoroethylene (PTFE), polyurethane (PU), and/or polyvinyl chloride (PVC). The polymeric liner 14 may be formed of a single layer of polymeric material or may comprise a multi-layered structure of two or more polymeric layers and further may include one or more metal layers or additives, as desired for specific applications.

Figure 3A:
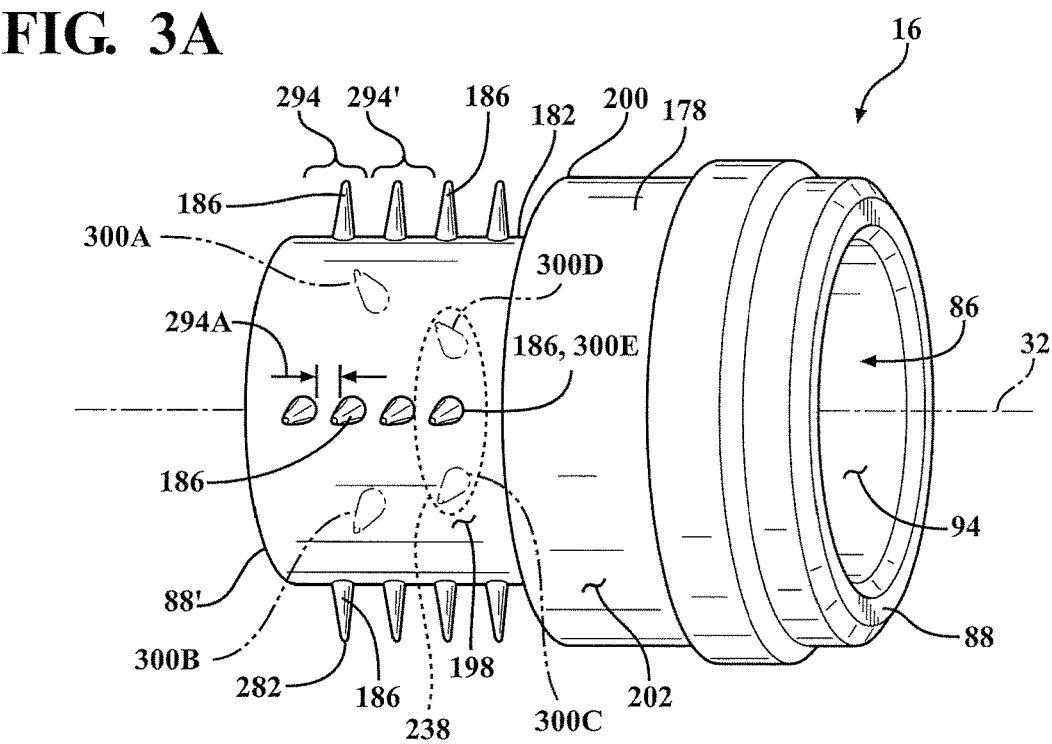
FIG. 3A shows a perspective view of the boss of FIG. 1 removed from the pressure vessel.
Figure 3B:
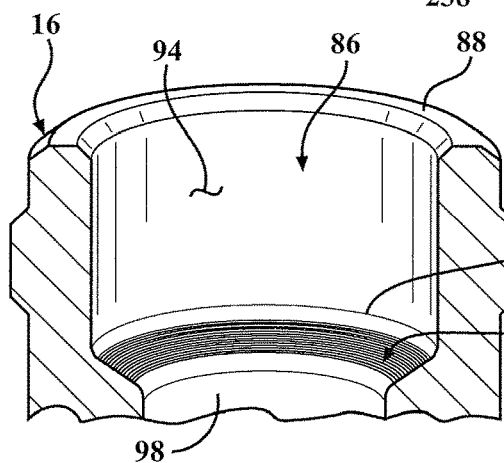
FIGS. 3B-3D show cut-away views of the boss of FIG. 3A illustrating fine ridges, a rough surface texture, and a smooth surface texture, respectively, on a boss cone surface.
Figure 3C:
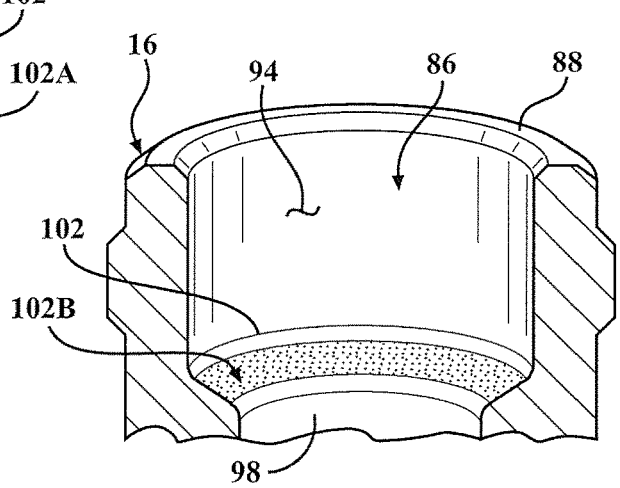
Figure 3D:
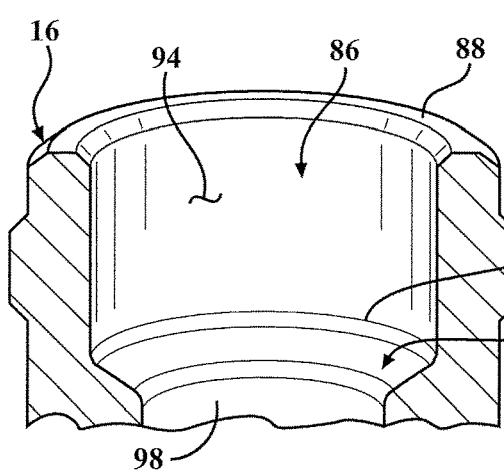

The boss 16 of FIG. 1 is shown in FIG. 3A removed from the pressure vessel 10. Referring to FIGS. 2 and 3A, the boss 16 has a bore 86 passing axially through the boss 16 between opposing terminal ends 88, 88' of the boss 16. The longitudinal axis of the boss 16 is shown by element 32 in FIG. 3A. The bore 86 is comprised of a neck portion 98, a cone surface 102 and a mating surface 94. The boss cone surface 102 can include one or more fine ridges 102A, a rough surface texture 102B, and/or a smooth surface texture 102C, as illustrated in FIGS. 3B-3D, respectively. In the embodiment shown in FIGS. 1 and 2, the flare edge 62 of the liner 14 is fixedly coupled to and sealed against the cone surface 102.

The flare edge 62 of the liner 14 conforms to the cone surface 102. The flare edge 62 is formed during liner 14 extrusion process or formed or thermoformed directly against the cone surface 102 of the boss 16. The neck section 118 of the liner 14 conforms to the neck portion 98. The neck section 118 is formed during a liner 14 extrusion process and can be additionally thermoformed against the neck portion 98 to enhance the seal.

Figure 4A:
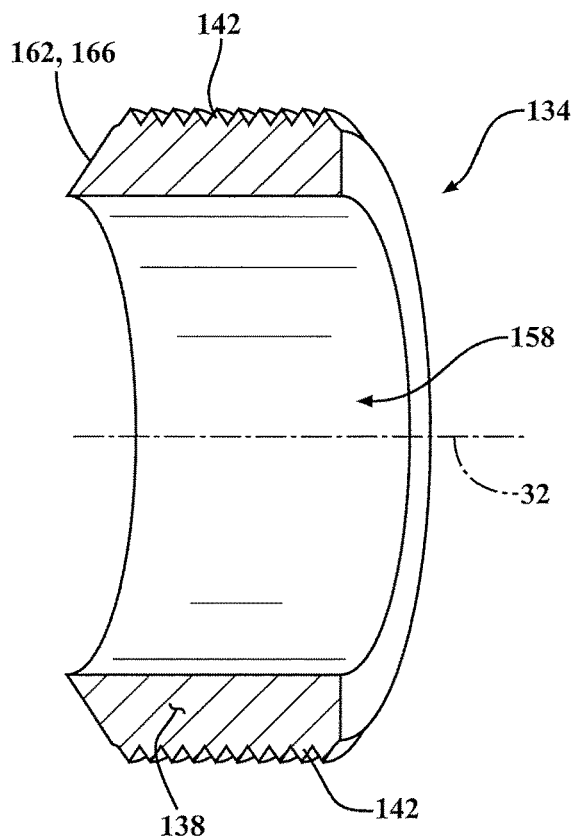
FIG. 4A shows a cross-sectional view of the sealing insert of FIG. 1 removed from the pressure vessel.

A sealing insert 134, shown in FIGS. 1 and 2, is shaped to fit within and engage with the mating surface 94 of the boss 16. The sealing insert 134 of FIG. 1 is shown in FIG. 4A prior to assembly with the boss 16. Referring to FIG. 4A, the sealing insert 134 has a generally cylindrical main body portion 138 with a mating surface 142 extending around an outer periphery of the cylindrical main body portion 138 configured to meshingly engage with the mating surface 94 by means of threads, press fit, swaging, or the like. The longitudinal axis of the sealing insert 134 is shown by element 32 in FIG. 4A.

Figure 4B:
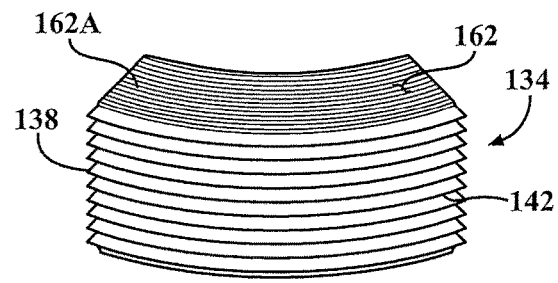
FIGS. 4B-4D show perspective views of a portion of the sealing insert of FIG. 4A illustrating fine ridges, a rough surface texture, and a smooth surface texture, respectively on a cone surface of the sealing insert.
Figure 4C:
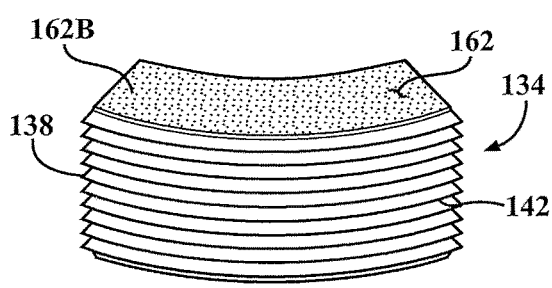
Figure 4D:
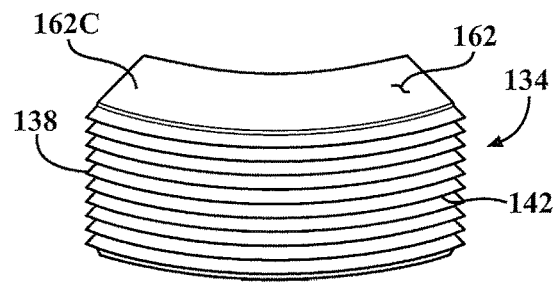

Further, the sealing insert 134 includes a bore 158 passing axially through the sealing insert 134. Extending from the main body portion 138 of the sealing insert 134 is a cone surface 162 configured to seal against the flare edge 62 of the liner 14. The cone surface 162 can include one or more fine ridges 162A, a rough surface texture 162B, and/or a smooth surface texture 162C, as illustrated in FIGS. 4B-4D, respectively.

Also shown in FIG. 2, when the sealing insert 134 is engaged with the mating surface 94 of the boss 16, the flare edge 62 of the liner 14 is compressed between an outer surface 166 of the sealing insert 134 and the boss cone surface 102 of the bore 86 to provide the seal.

The compression applied by the sealing insert 134 against the flare edge 62 of the liner 14 forms a seal between the liner 14 and the boss cone surface 102 of the boss 16, as shown in FIG. 2. Pinching the liner 14 between the bore 86 and the sealing insert 134 forms an initial seal between the boss 16 and the liner 14. The neck portion 98 forms a seal with the liner 14 outer surface 54 after the liner 14 is pressurized.

Alternatively, one or more supplemental seals, such as an O-ring and the like, can be included adjacent the liner 14, the bore 86, and/or the sealing insert 134 if desired for specific applications. The seal between the liner 14 flare edge 62, the boss cone surface 102, and the sealing insert 134 can be improved by including a rough surface texture 102B, 162B and/or fine ridges 102A, 162A on the boss cone surface 102 and/or on cone surface 162 of the sealing insert 134, if desired for certain embodiments. In other embodiments, a satisfactory seal will be obtained with a smooth surface texture 102C, 162C on both the boss cone surface 102 and the cone surface 162 of the sealing insert 134.

Returning to FIG. 3, the boss 16 has a generally cylindrical portion 178 connected to a shank 182. In the embodiment shown in FIGS. 1-3A, the shank 182 has an outer bearing surface 198 and a generally cylindrical shape. The bearing surface 198 of the shank 182 is located against the outer composite shell 18. The shank 182 shown in FIG. 1 extends along the neck region 40 and along a portion of the taper region 42 of the liner 14.

The mechanical fastening between the outer composite shell 18 and the boss 16 is achieved by spikes 186 project radially away from the bearing surface 198 of the shank 182, as shown in FIGS. 1 and 2. The spikes 186 are at least partially embedded in the outer composite shell 18 to mechanically fasten the boss 16 to the outer composite shell 18. The engagement of the spikes 186 with the outer composite shell 18 allows the boss 16 to oppose the internal pressure and increases the amount of boss torque that can be tolerated without the boss 16 separating from the liner 14 and/or the outer composite shell 18.

The boss 16 optionally includes a flange shoulder 200 that is positioned on an outer surface 202 of the boss 16 between the generally cylindrical portion 178 and the shank 182, as shown in FIGS. 1-3A. The flange shoulder 200 contacts the outer composite shell 18. Alternatively, the outer composite shell 18 can extend along a portion of the shank 182 without abutting a flange shoulder 200 on the boss 16.

The liner 14 is optionally fabricated with mounting features 206 (shown in FIG. 18) that aid with positioning and assembly of the boss 16 with the liner 14. The liner 14 is cut and/or trimmed, if needed, to allow for assembly with the boss 16. After the boss 16 and other fittings are assembled with the liner 14, the liner 14 and/or the boss 16 are optionally heated to cause the liner 14 to conform and/or adhere to the boss 16.

After the boss 16 and the liner 14 are assembled, the liner 14 and/or the shank 182 can be covered with a resin barrier layer, such as a polymeric film, if desired for a specific application. Additionally, optional breather layers, or a secondary gas barrier layers, can be wrapped around portions and/or the entire length of the liner 14 and the shank 182, as desired for specific applications. Suitable materials for the breather layer include woven glass fiber cloth, non-woven glass fiber cloth, and the like. Suitable gas barrier layers include metalized films, EVOH films, and the like.

Figure 5:
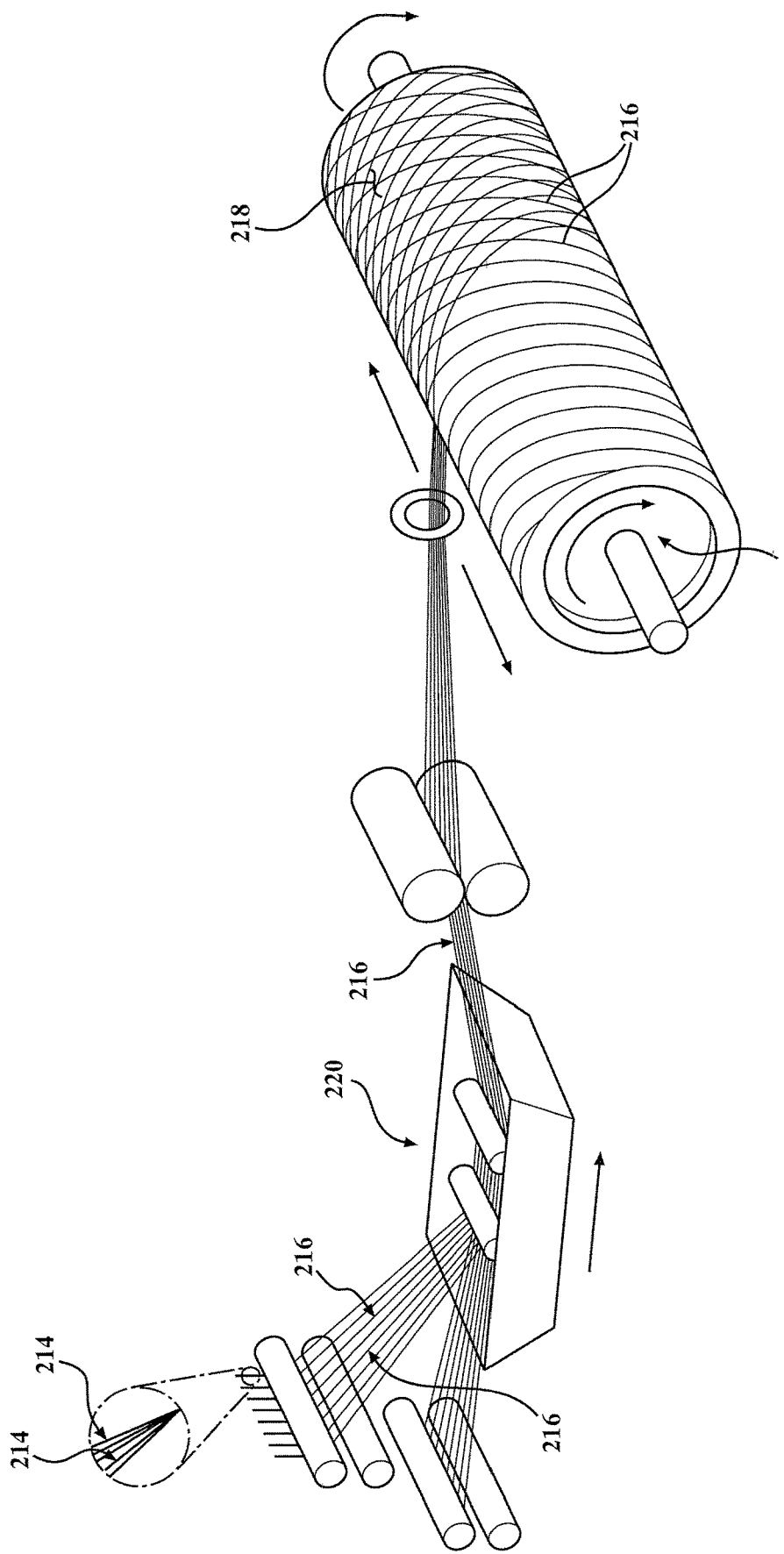
FIG. 5 illustrates a known method of wrapping a strand of resin impregnated fibers around a liner in a helical pattern.
Figure 6:
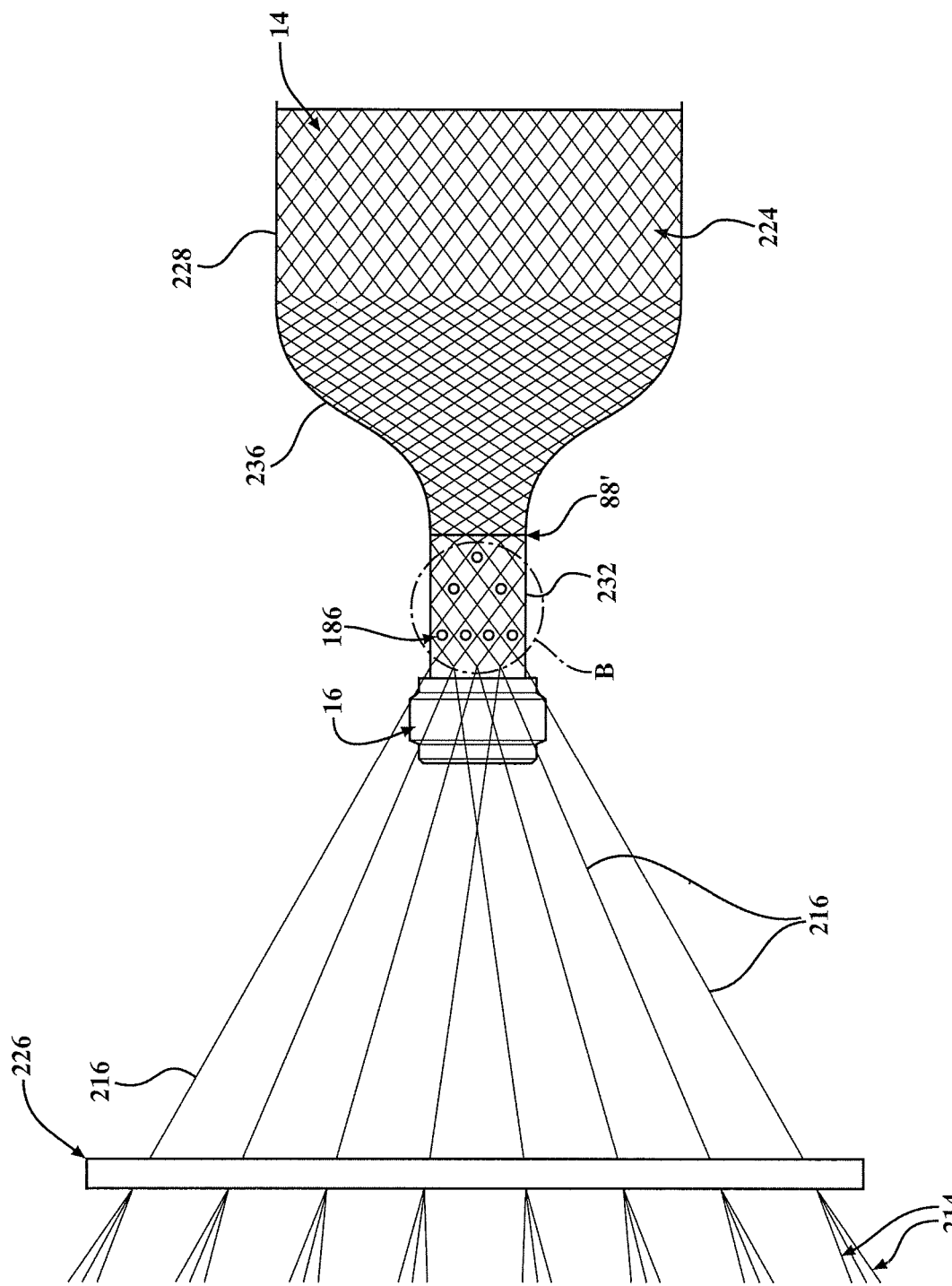
FIG. 6 illustrates a braiding process wherein fiber strands are over-braided around the pressure vessel of FIG. 1.

The outer composite shell 18 of the pressure vessel 10 is generally formed by disposing resin impregnated fibers 214 onto the liner 14 after the liner 14 and boss 16 have been assembled as shown in FIGS. 5 and 6.

A first known method of applying resin impregnated fibers 214 to the liner 14 is filament winding, and is illustrated in FIG. 5. A plurality of fiber filaments 214 is grouped to faun a fiber strand 216. The plurality of fiber filaments 214 can be grouped to foim a fiber strand 216 before or during a manufacturing process to apply fibers 214 to the liner 14. Likewise, a single fiber strand 216 or a grouping of a plurality of fiber strands 216 can be applied at given time as desired for the manufacturing process. Fiber strands 216 can be applied to the liner 14 by continuous wrapping one or more fiber strands 216 around the liner 14 in overlapping helical patterns to form one or more wrapped fiber layers 218, as illustrated in FIG. 5. The fiber strands 216 can be coated with liquid resin 220 prior to being wrapped on the liner 14, as shown in FIG. 5. Alternatively, the fiber strands 216 can be coated with liquid resin 220 after being wrapped on the liner 14 and/or the fiber filaments 214 can be pre-impregnated with resin 220. The resin 220 is cured such that the resin 220 and wrapped fiber layers 218 form a rigid outer composite shell 18 surrounding the liner 14.

A second method of applying resin impregnated fibers 214 to the liner 14 is braiding the fibers 214 as illustrated in FIG. 6. As with the first method, a plurality of fiber filaments 214 is assembled to form a fiber strand 216. A plurality of fiber strands 216 are over-braided around the liner 14 to form a braided fiber layer 224 using a braiding machine 226, as illustrated in FIG. 6. Further, the fiber strands 216 can be impregnated with resin 220 prior to, during, and/or after braiding the fibers strands 216 around the liner 14.

Over-braiding a plurality of fiber strands 216 around an elongated liner 14 using braiding, a process illustrated in FIG. 6 will form a braided fiber layer 224 that confouns to larger diameter cylindrical sections 228, smaller diameter cylindrical sections 232, and tapered transition sections 236 of an elongated liner 14 for a pressure vessel 10. Likewise, the over-braiding process 226 shown in FIG. 6 can form braided fiber strands 216 over the shank 182 of the boss 16. The over-braiding process 226 is a preferred method of applying resin impregnated fibers 214 to conformable pressure vessels 10 that can include a plurality of spaced apart larger diameter cylindrical sections 228 with adjacent larger diameter sections 228 being connected by a smaller diameter cylindrical section 232. When the resin 220 is cured, the resin 220 and braided fiber strands 216 form a rigid outer composite shell 18 surrounding the liner 14.

The outer composite shell 18, shown in FIG. 1, includes one or more layers of resin impregnated fiber 214. Suitable fibers 214 for the outer composite shell 18 include one or more of carbon fiber, glass fiber, basalt fiber, boron fiber, aramid fiber, high-density polyethylene fiber (HDPE), Zylon™ poly(p-phenylene-2,6-benzobisoxazole fiber (PBO), aramid fiber, Kevlar® poly-paraphenylene terephthalamide fiber, Nylon fiber (PA), polyethylene naphthalate (PEN), polyester fiber (PL ), and the like. Suitable resins 220 include one or more of epoxy resin, vinylester resin, polyester resin, thermoplastic resins, urethane, and the like.

The selection of materials and dimensions for the liner 14, as well as the type and amount of resin 220 and fiber 214 forming the outer composite shell 18, are selected based in part on the desired operating conditions of the pressure vessel 10. Further, inclusion of one or more of a breather layer, a barrier layer, and/or a metallic layer between the liner 14 and the outer composite shell 18, as well as the material composition of the additional layers, is based in part on the desired operating conditions of the pressure vessel 10.

Figure 7:
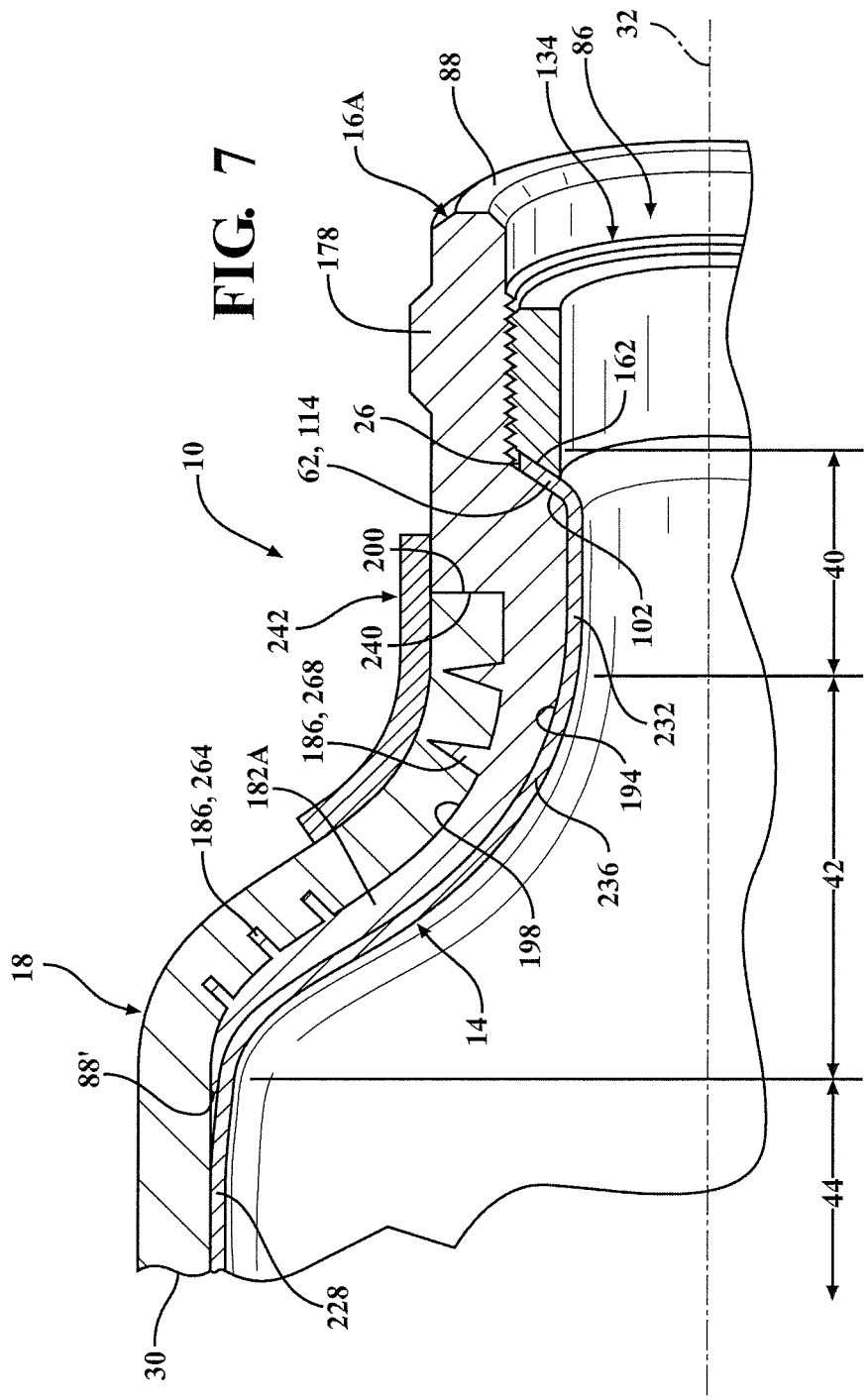
FIG. 7 illustrates a cross-sectional view of a second embodiment of the pressure vessel of FIG. 1, wherein a shank of the boss extends along a tapered region of the liner.

The outer composite shell 18 is formed around an outer periphery 198 of the shank 182 with the outer composite shell 18 abutting the flange shoulder 200, as illustrated in FIG. 2. The fiber strands 216 are trimmed adjacent the flange shoulder 200 to from a composite free edge 240. The flange shoulder 200 supports and protects the composite free edge 240. If the boss 16 lacks a flange shoulder 200, then the fiber strands 216 are trimmed at a predetermined location to form the composite free edge 240. The composite free edge 240 can be protected and/or reinforced by applying tape 242 covering the flange shoulder 200 and the composite free edge 240, as shown in FIG. 7. Alternatively, the composite free edge 240 near the flange shoulder 200 can be covered by additional fiber strands 216, a crimp ring such as a ferrule, or the like. Suitable fibers 214 for covering the composite free edge 240 include carbon fiber, glass fiber, nylon fiber, and the like. Applying tape, fiber strands 216, and/or a crimp ring over the composite free edge 240 can prevent edge delamination, improve pressure vessel 10 aesthetics, and/or provide a support area for a pressure vessel 10 mount.

Figure 8:
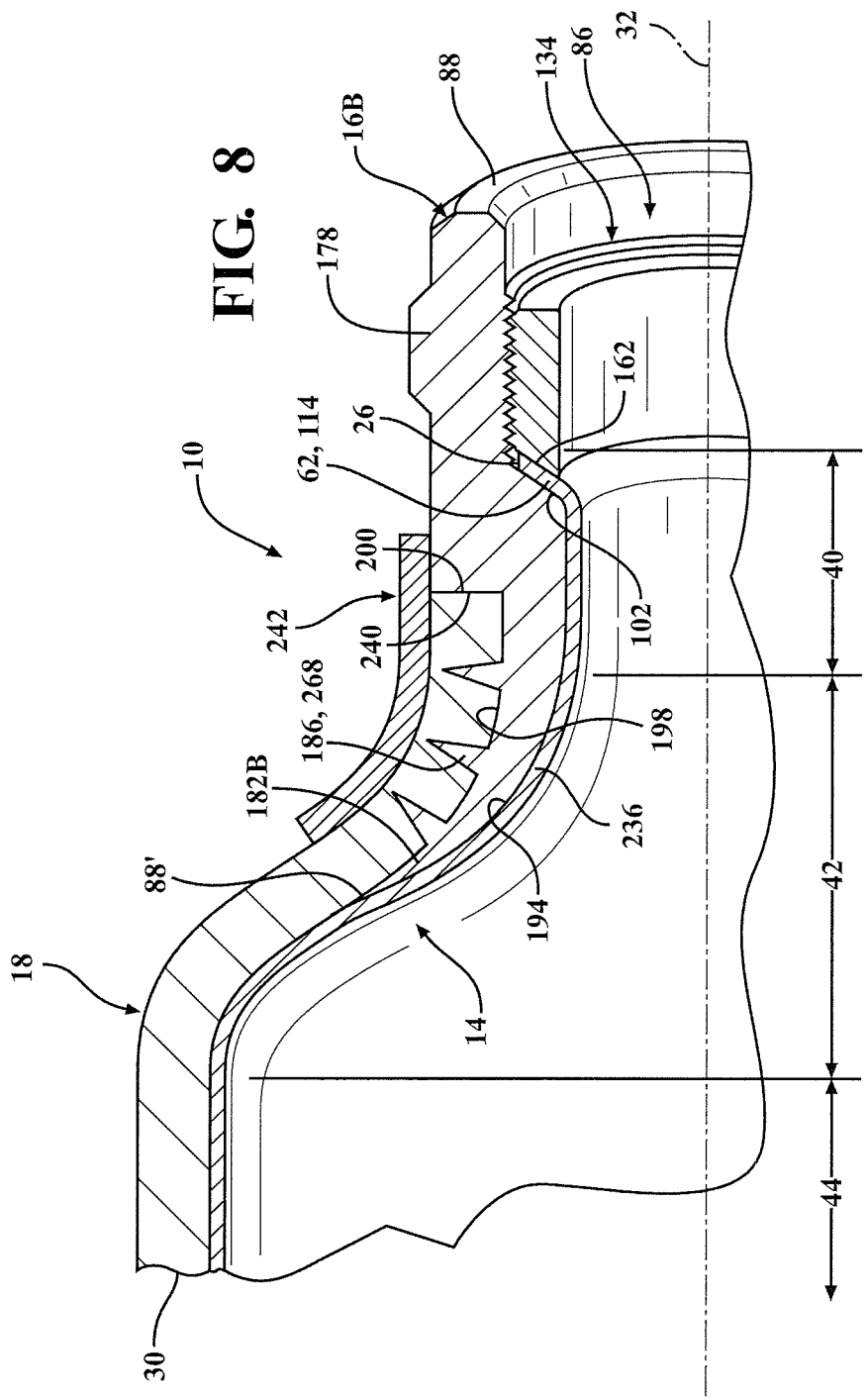
FIG. 8 illustrates a cross-sectional view of a third embodiment of the pressure vessel of FIG. 1, wherein the shank of the boss extends partially along the tapered region of the liner.

Optionally, the inner surface 194 of the shank 182 can be configured to matingly engage with a tapered section 236 of the liner 14, such as illustrated in FIGS. 7 and 8. FIG. 7 shows a second embodiment of the pressure vessel 10 having a boss 16A with a shank 182A that supports the tapered section 236 along the entire tapered region 42 of the liner 14. Optionally, the boss 16A extends along the tapered section 236 all the way past the tapered region 42 and overlaps a portion of the larger diameter cylindrical section 228 of the liner 14. The shank 182A shown in FIG. 7 provides full taper anchoring along the tapered section 236. The boss 16A absorbs most of the hoop stress of the liner 14 and reduces load on the tapered section 236 of the liner 14. The increased contact area between the boss 16A and the liner 14 of FIG. 7 improves the quality of seal. The amount of boss torque that can be tolerated without the boss 16 separating from the liner 14 and/or the outer composite shell 18 is increased by the addition of spikes 186 projecting radially from the shank 182A.

In contrast to the embodiments shown in FIGS. 1 and 7, a third embodiment of a boss 16B shown in FIG. 8 has a shank 182B that supports the tapered section 236 along a portion of the tapered region 42 of the liner 14. The boss 16B provides partial taper anchoring since the shank 182B only supports a portion of the tapered region 42. The shorter shank 182B shown in FIG. 8 provides less support for the tapered section 236 than the longer shank 182A shown in FIG. 7. However, the shorter shank 182B has less material cost than the longer shank 182A. Further, the boss 16B of FIG. 8 is lighter than the full taper anchoring boss 16A shown in FIG. 7. The shape, length, and dimensions of the shank 182, 182A, 182B are selected based in part on the desired operating conditions of the pressure vessel 10 as well as secondary factors such as material cost and component weight, and the like.

Figure 9:
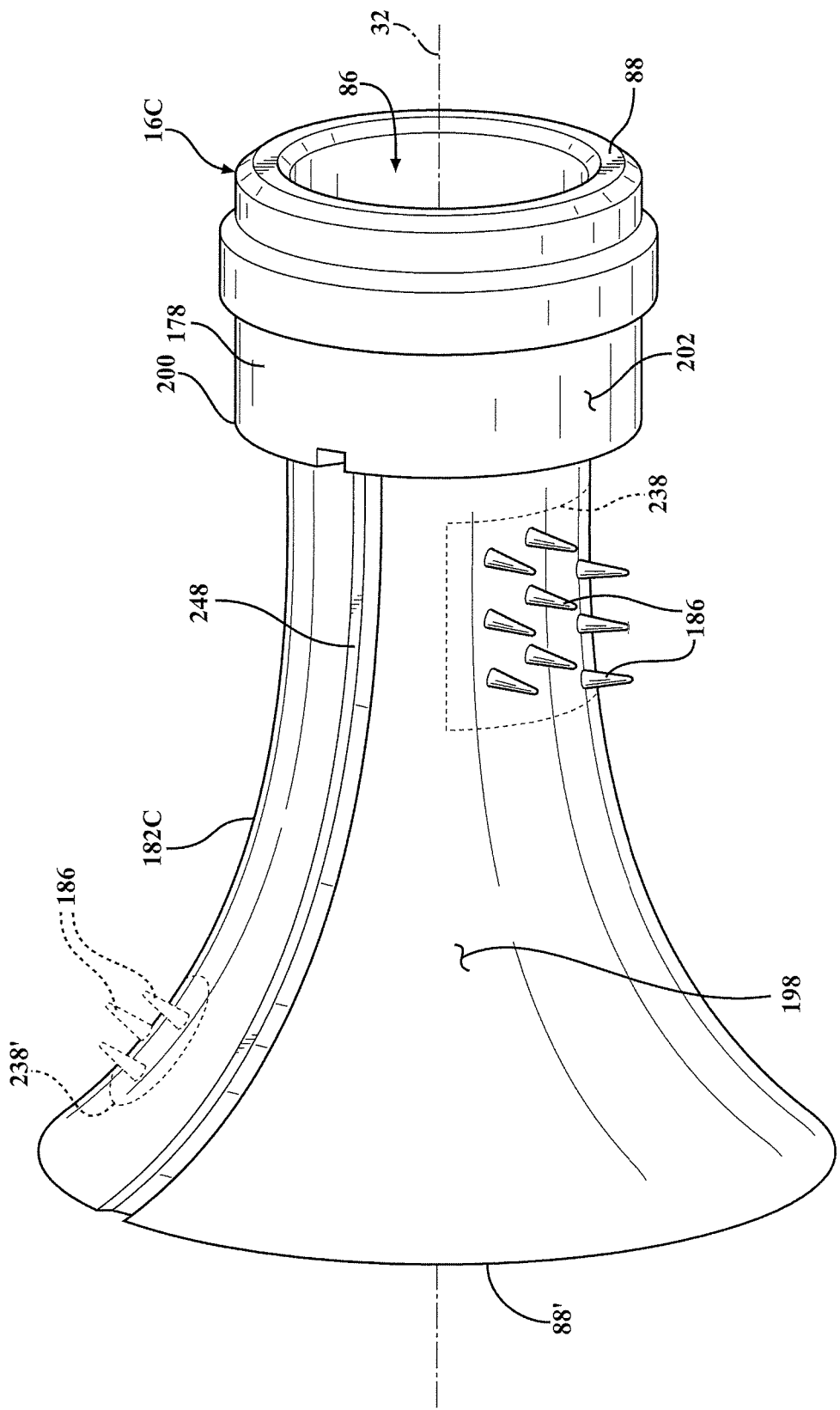
FIG. 9 shows a perspective view of another embodiment of the boss of FIG. 3A.

Turning to FIG. 1, spikes 186 projecting radially away from the shank 182, 182A, 182B and embedded into the outer composite shell 18 mechanically fasten the boss 16, 16A, 16B to the outer composite shell 18. The spikes 186 can be distributed over the entire outer bearing surface 198 of the shank 182, 182A, 182B. A fourth embodiment is shown in FIG. 9 of a boss 16C that illustrates alternate placement of the spikes 186 on a shank 182C. As illustrated by FIG. 9, the spikes 186 can be placed in one or more specific zones 238, 238' on the shank 182C. The number, shape, size, and position of the spikes 186 attached to the shank 182-182C are selected based on the expected nominal working pressure or boss torque on the pressure vessel 10 during use, the dimensions of the shank 182-182C, the dimensions of the outer composite shell 18, and the like. The spikes 186 can be distributed over the entire outer bearing surface 198 of the shank 182B or the spikes 186 can be placed in specific zones 238, 238' on the shank 182B.

The boss 16C is shown in FIG. 9 prior to assembly with the pressure vessel 10. The boss 16C has a shank 182C configured to matingly engage with the tapered section 236 of the liner 14. Thus, the shank 182C has a tapered conical shape and/or a tapered cylindrical shape that abuts the flange shoulder 200. When the boss 16C is assembled with the liner 14 and covered with the outer composite shell 18, spikes 186 projecting radially away from the outer bearing surface 198 of the shank 182C are embedded into the outer composite shell 18 to mechanically fasten the boss 16C to the outer composite shell 18.

Also shown in FIG. 9 is an optional vent groove 248 extending longitudinally along the outer bearing surface 198 of the shank 182C and radially along the flange shoulder 200. The boss 16C can include any number and configuration of vent grooves 248, as desired for specific applications, to allow for hydrogen gas venting from the interface between the liner 14 and outer composite shell 18 to the atmosphere. Gas permeates through the liner 14 and collects in a gap between the liner 14 and the outer composite shell 18. The peimeate gas is vented to atmosphere through the vent groove 248 to prevent a subsequent collapse of the liner 14.

In addition, since both the liner 14 and the outer composite shell 18 are fixedly coupled to the boss 16, as shown in FIG. 1, forces applied to the boss 16 are distributed to the outer composite shell 18. In contrast, when the boss 16 is inserted into an opening in a liner 14 that covered with an outer composite shell 18 followed by crimping a ferrule around the outer composite shell 18, the boss 16 only directly contacts the liner 14. The ferrule is fixedly coupled to the outer composite shell 18 and fixedly coupled to the boss 16. However, the boss 16 is not directly fixedly coupled to the outer composite shell 18. Instead, the connections between the ferrule and the outer composite shell 18 and between the ferrule and the boss 16 form the mechanical coupling between the boss 16 and the outer composite shell 18. Gaps can form over time between the liner 14 and the outer composite shell 18. Further, the ferrule can separate from the outer composite shell 18 and/or from the boss 16. Rotational and axial loads on the boss 16 can potentially weaken the adhesion of the liner 14 to the outer composite shell 18, weaken the ferrule crimp, and/or increase gaps that form between the liner 14 and the outer composite shell 18. If the ferrule crimp is loosened sufficiently, then the boss 16 can rotate within the ferrule. Movement of the boss 16 with respect to the outer composite shell 18 due to the weakened ferrule crimp can further cause the boss 16 to separate from the liner 14. Replacing the ferrule with the spikes 186 on the boss 16 directly couples the boss 16 to the outer composite shell 18 when the spikes 186 are embedded into the outer composite shell 18. In some embodiments, the spikes 186 can be combined with the ferrule to increase the mechanical coupling between the boss 16 and the outer composite shell 18. The inclusion of the spikes 186 embedded into the outer composite shell 18 can be combined with a number of different fastening methods that attach the boss 16 to the liner 14 and to the outer composite shell 18 if desired and/or required depending on the expected load on the boss 16.

Figure 10:
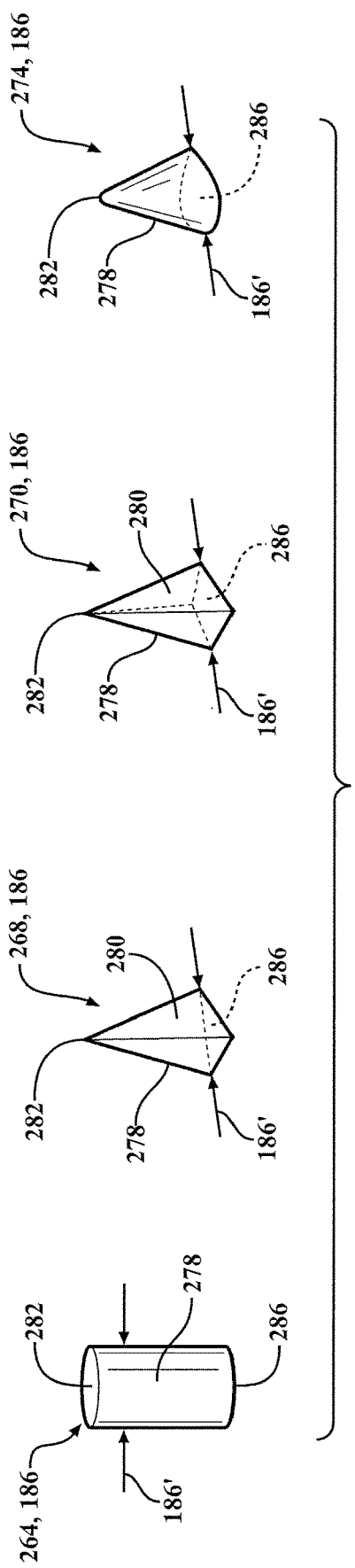
FIG. 10 is a perspective view of embodiments of spikes prior to assembly with the boss of FIG. 3A.

The spikes 186 can have various shapes, such as illustrated in FIG. 10. Variations in suitable spikes 186 include cylindrical-shaped spikes 264, tetrahedron-shaped spikes 268, pyramid-shaped spikes 270, and conical-shaped spikes 274, as non-limiting examples. The tetrahedron-shaped spikes 268 have three lateral faces 280. The pyramid-shaped spikes 270 have four or more lateral faces 280, including but not limited to five, six, seven, or more lateral faces 280. Each spike 186, 264, 268, 270, 274 has a spike main body 278 extending between a spike tip 282 and a spike base 286. The spike tip 282 can be peak-shaped, as illustrated by the pyramid spike 270. Alternatively, the spike tip 282 can have a rounded shape, as illustrated by the spike tip 282 of the conical spike 274. Any shape of spike 186 suitable for an intended application can be used, including a mixture of spike 186 shapes and sizes.

Figure 11:
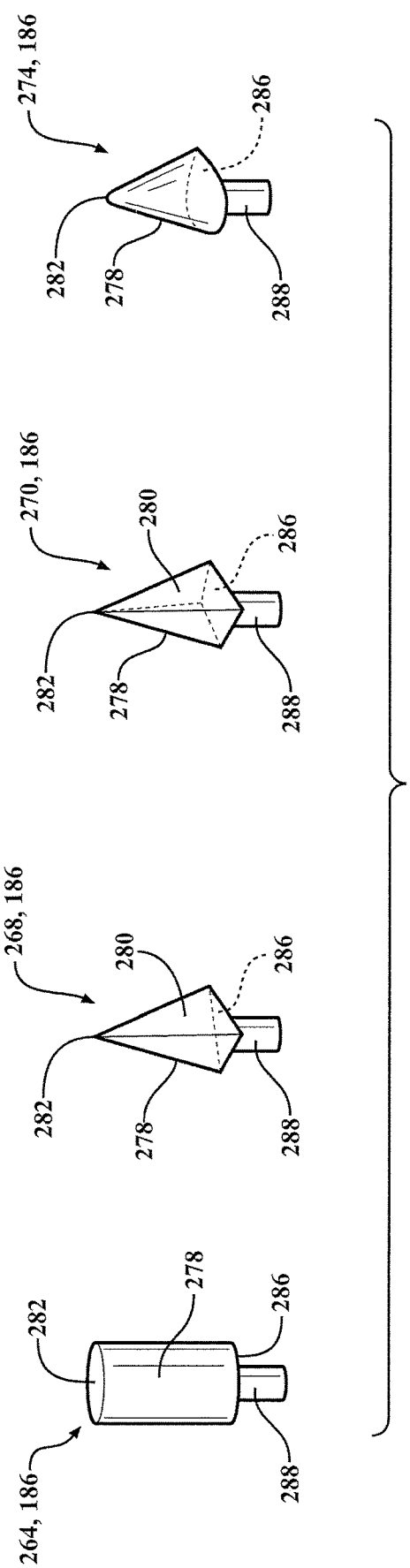
FIG. 11 is a perspective view of embodiments of the spikes of FIG. 10 having a cylindrical-shaped pin projecting longitudinally away from a base of each spike.

The spike base 286 can include a cylindrical-shaped pin 288 projecting longitudinally away from the spike base 286, as illustrated in FIG. 11. FIG. 11 shows non-limiting embodiments of a cylindrical-shaped spike 264, a tetrahedron-shaped spike 268, a pyramid-shaped spike 270, and a conical-shaped spike 274 having a cylindrical-shaped pin 288 projecting away from the spike base 286. The pin 288 allows for mounting different shaped spikes 186, 264, 268, 270, 274 into circular holes 290 in the shank 182, as illustrated in FIG. 12B. The circular holes 290 can be recessed cavities, through holes, and/or combinations of cavities and through holes. Further, the pin 288 and the holes 290 can be non-circular in some embodiments.

Figure 12A:
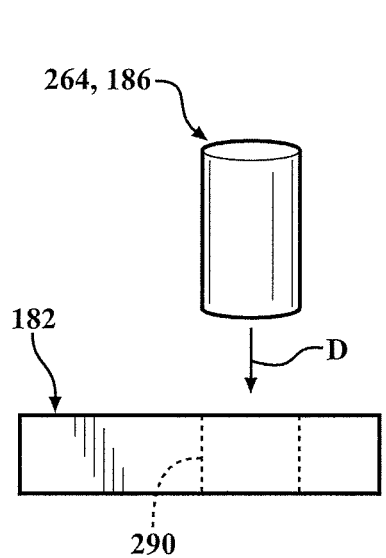
FIG. 12A illustrates an assembly method wherein the cylindrical-shaped spike of FIG. 10 is press-fitted into a hole in the boss of FIG. 3A.
Figure 12B:
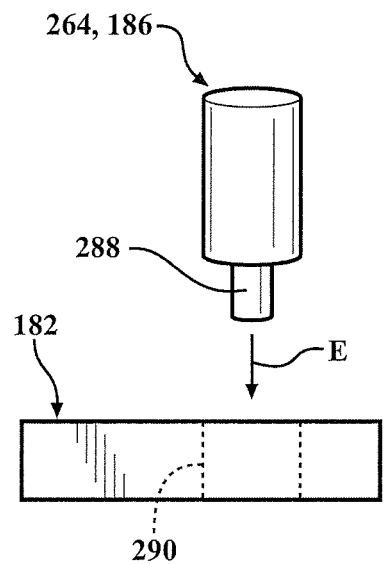
FIG. 12B illustrates an assembly method wherein the cylindrical-shaped spike of FIG. 11 is press-fitted into a hole in the boss of FIG. 3A.

FIGS. 12A-12D illustrate methods of attaching the spikes 186, 264, 268, 270, 274 to the shank 182. Pressing cylindrical-shaped spike 264 into a circular hole 290 in the shank 182, as illustrated by arrow D, is shown in FIG. 12A. The cylindrical-shaped spike 264 can be press-fitted (illustrated by arrow D) into a circular hole 290 sized to matingly receive the cylindrical-shaped spike 264. The circular hole 290 can be a partial depth hole 290 or a through-hole 290, as desired for a specific application.

The second attachment method shown in FIG. 12B is similar to the attachment method shown in FIG. 12A. The cylindrical-shaped spike 264, the tetrahedron-shaped spike 268, the pyramid-shaped spike 270, and the conical-shaped spike 274 can include a cylindrical-shaped pin 288 projecting away from spike base 286, as shown in FIG. 11. The pin 288 is press-fitted (illustrated by arrow E) into a circular hole 290 in the shank 182 having an inner diameter sized to matingly engage with the pin 288, as shown in FIG. 12B. The addition of the pin 288 to the spike base 286 allows for press-fitting non-cylindrical spikes 268, 270, 274 to the shank 182 using circular holes 290.

Figure 12C:
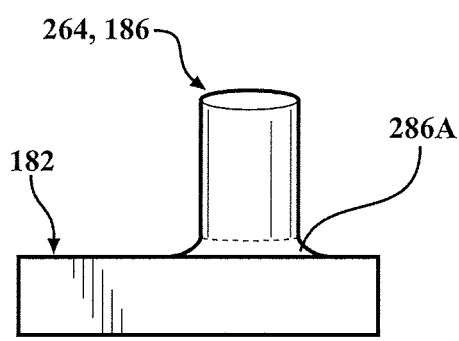
FIG. 12C illustrates an assembly method wherein the cylindrical-shaped spike of FIG. 10 is welded to the boss of FIG. 3A.

Welding the spike 186 to the shank 182 is a third attachment method illustrated in FIG. 12C. The spike base 286 of each of spikes 186, 264, 268, 270, 274 can be welded 286A and/or adhered to the shank 182. FIG. 12C illustrates welding a spike base 286 of a cylindrical-shaped spike 264 to the outer bearing surface 198 of the shank 182. A weld line 286A is formed around the base 286 of the spike 186. While the weld line 286A increases the diameter of the spike 186, it is unlikely to cause problems during the overbraiding process 226 since the weld line 286A is adjacent the shank 182. In some embodiments, the spikes 186 can be adhered to the shank 182 with an adhesive. Welding and adhering attachment methods can accommodate a variety of spike 186 shapes, including the cylindrical-shaped spike 264, the tetrahedron-shaped spike 268, the pyramid-shaped spike 270, and the conical-shaped spike 274 shown in FIG. 11, as well as other shapes of spikes 186.

Figure 12D:
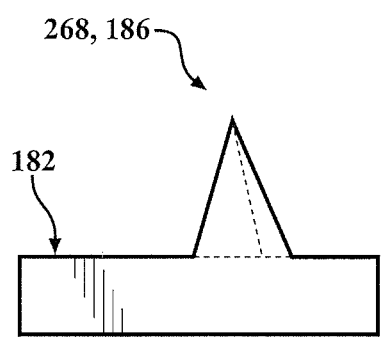
FIG. 12D illustrates the pyramid-shaped spike of FIG. 10 integrally formed with the boss of FIG. 3A.

A fourth method, illustrated in FIG. 12D, is machining and/or molding the spike 186 when the shank 182 is formed. The fourth method can be used to form cylindrical-shaped spikes 264, tetrahedron-shaped spikes 268, pyramid-shaped spikes 270, and conical-shaped spikes 274, as non-limiting examples. During a machining process, material is removed around the spike 186 to form the spike 186. Alternatively, the spikes 186 can be integrated into a molding tool when the boss 16 is formed during a molding process.

Referring to FIG. 3A, a plurality of spikes 186 are fixedly coupled to the shank 182 of the boss 16. In the embodiment shown in FIG. 3A, the spikes 186 are distributed around the outer periphery 198 of the shank 182. The spikes 186 can be arranged in a plurality of rows 294, 294' of spikes 186 with four rows 294, 294' of spikes 186 shown in the exemplary embodiment of FIG. 3A.

As shown in FIG. 3A, a row 294, 294' of spikes 186 is defined as a plurality of spikes 186 spaced around an outer periphery 198 of the shank 182 wherein the axial distance measured between a terminal end 88' of the boss 16 and a center of each spike tip 282 within the row 294, 294' of spikes 186 is within a range defined by a predefined amount. In one embodiment, the predefined amount may be a multiple of the maximum width 186' of the spikes 186 comprising the row 294, 294' of spikes 186, wherein the multiple is 1, 2, 3, or more, as a non-limiting example.

Adjacent rows 294, 294' of spikes 186 are spaced apart in an axial direction of the boss 16, as shown in FIG. 3A. The axial distance 294A between adjacent rows 294, 294' of spikes 186 can be uniform between the rows 294, 294' or the spacing can be non-uniform, i.e., some of the rows 294, 294' being spaced closer together than the spacing between other rows 294, 294' of spikes 186.

Figure 16:
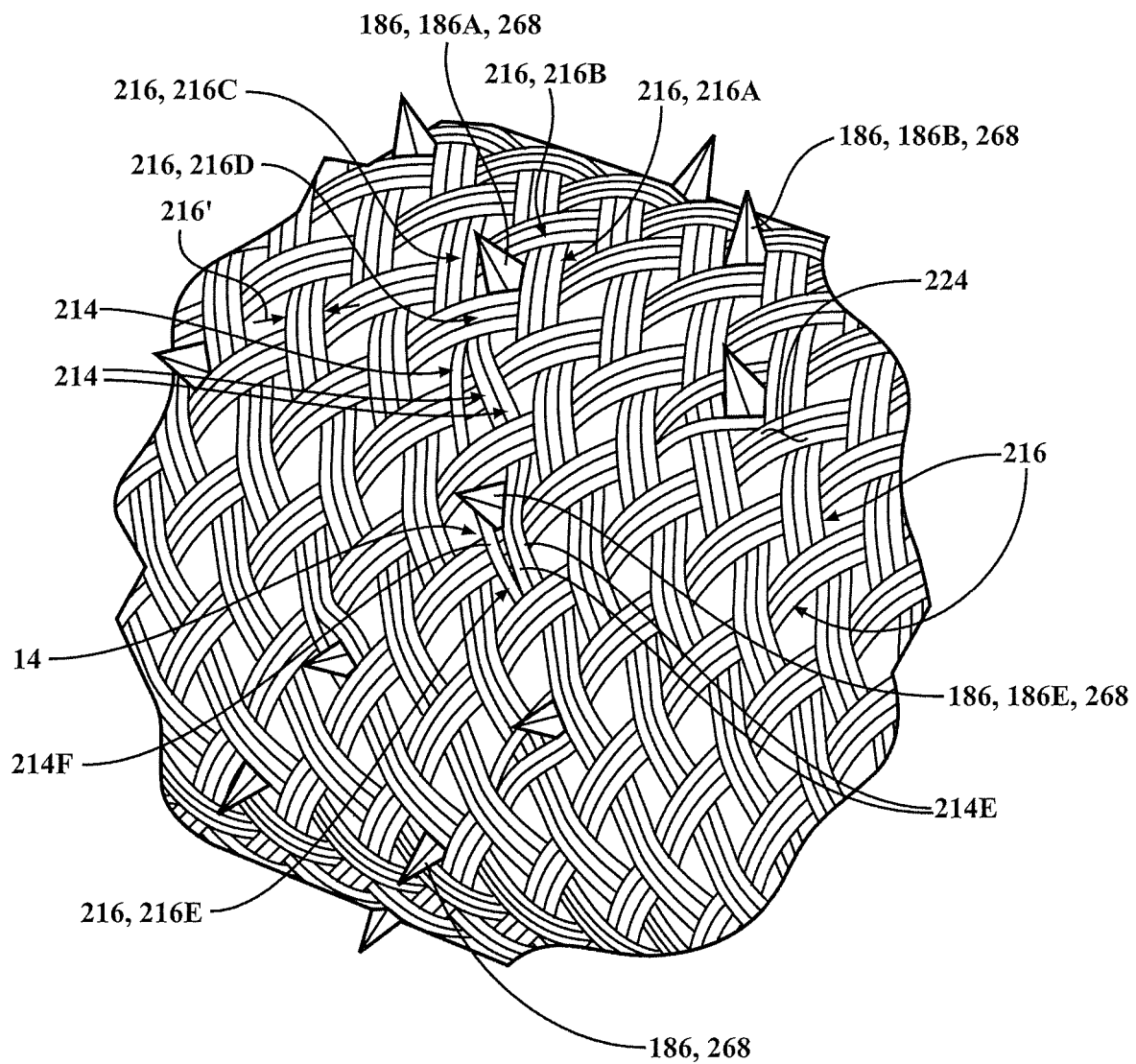
FIG. 16 illustrates a first embodiment of a portion B of the pressure vessel of FIG. 6, illustrating tetrahedron-shaped spikes extending through braided fiber strands of the outer composite shell.

Further, the spikes 186 in a first row 294 are aligned in an axial direction of the boss 18 with spikes 186 in a second row 294' of spikes 186 in the embodiment shown in FIG. 3A. However, it will be understood that any number of spikes 186, any number of rows 294, 294' of spikes 186, as well as relative alignment of spikes 186 in a first row 294 with respect to the positional alignment of spikes 186 in an adjacent row 294', can vary without altering the scope of the invention. Spikes 300A-300D illustrate alternate exemplary spike 186 locations on the shank 182 of FIG. 3A. With the inclusion of spikes 300A and 300B, the second row 294' of spikes 186 will have more spikes 186 than present in the first row 294 of spikes 186. Further, spikes 300A and 300B are offset from the spikes 186 forming the first row 294 of spikes 186. Spikes 300C and 300D are positioned near spike 300E to create a local zone 238 with additional spikes 300C-300E. In addition, spikes 186 in a first row 294 of spikes 186 can be circumferentially offset from the spikes 186 in an adjacent row 294' of spikes 186, as illustrated in FIG. 16 described below, if desired for a specific application.

Figure 13:
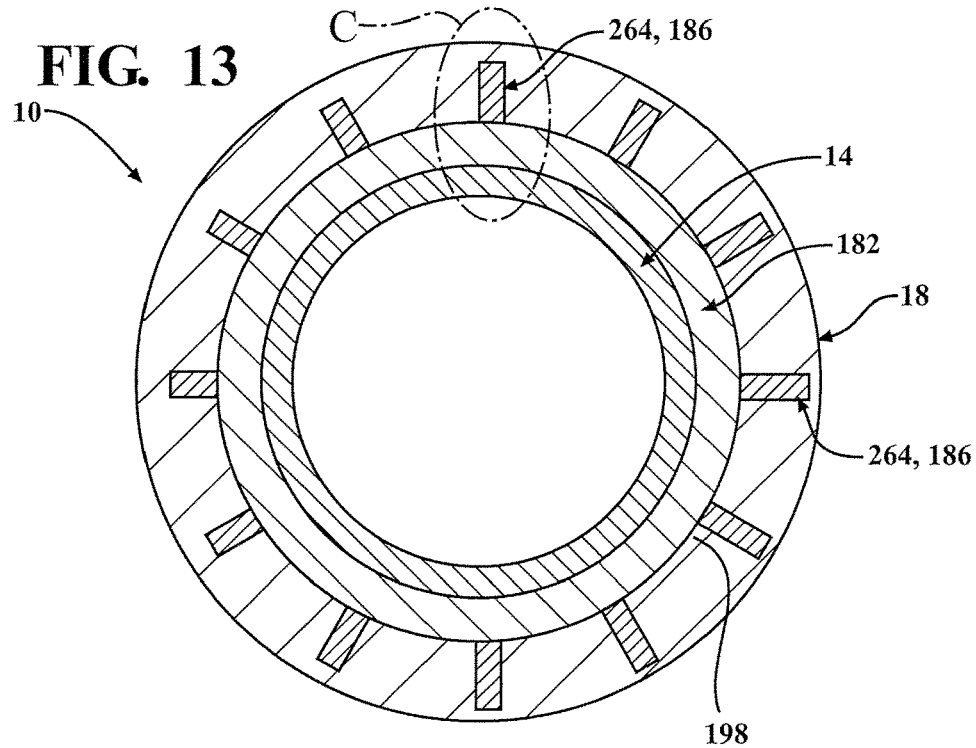
FIG. 13 is sectional view of the pressure vessel of FIG. 1 taken along section line A-A, illustrating a row of spikes arranged around the outer periphery of the boss.

An exemplary arrangement of spikes 186 around the outer circumference 198 of the shank 182 is illustrated in FIG. 13. FIG. 13 is a sectional view of the pressure vessel 10 of FIG. 1 taken along section line A-A. FIG. 13 shows twelve spikes 186 forming a row 294 of spikes 186 attached to the shank 182. The spikes 186 are shown in FIG. 13 positioned equidistant around the outer periphery 198 of the shank 182. However, the spikes 186 can be positioned such that the spikes 186 are not spaced equidistant around the outer periphery 198 of the shank 182. The spikes 186 shown in FIG. 13 are fully embedded into the outer composite shell 18. However, in certain embodiments the spikes 186 can be configured to penetrate partially into the outer composite shell 18.

Further, the number of spikes 186 can be selected based on the requirements of specific applications. Preferably, the shank 182 includes at least four spikes 186. While generally cylindrical-shaped spikes 264 are shown in FIG. 13, tetrahedron-shaped spikes 268, pyramid-shaped spikes 270, conical-shaped spikes 274, and the like, can be used in place of the cylindrical-shaped spikes 264 if desired for a specific application. In addition, the spikes 186 can include one or more shapes of spikes 186, i.e., a first portion of the spikes 186 can be selected to be cylindrical-shaped spikes 264 with the remaining spikes 186 being pyramid-shaped spikes 270, as a non-limiting example.

Further, spikes 186 can be distributed in one or more local zones 238, 238' on the shank 182, as shown in FIG. 9, instead of distributing the spikes 186 around the outer periphery 198 of the shank 182, as illustrated in FIG. 13. Alternatively, the spikes 186 can be distributed into two or more local zones 238, 238' on the shank 182 wherein the two or more local zones 238, 238' being spaced apart on the outer bearing surface 198 of the shank 182. Optionally, the two or more zones 238, 238' can be in selected locations around the outer periphery 198 of the shank 182. In addition, the two or more zones 238, 238' can be positioned equidistant apart on the outer periphery 198 of the shank 182 if desired for a specific application.

Figure 14:
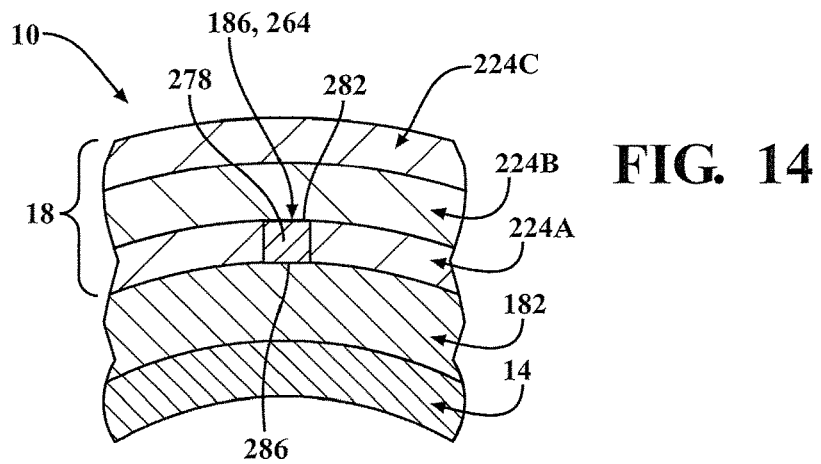
FIG. 14 illustrates a first embodiment of portion C of the sectional view of the pressure vessel of FIG. 13 showing the spike partially embedded into the outer composite shell.
Figure 15:
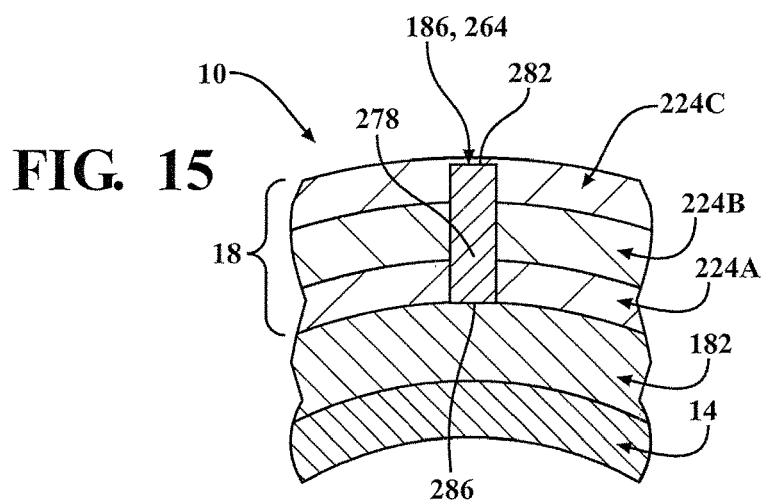
FIG. 15 illustrates a second embodiment of the portion C of the sectional view of the pressure vessel of FIG. 13 showing the spike embedded in all of the layers of fiber strands forming the outer composite shell.
Figure 18:
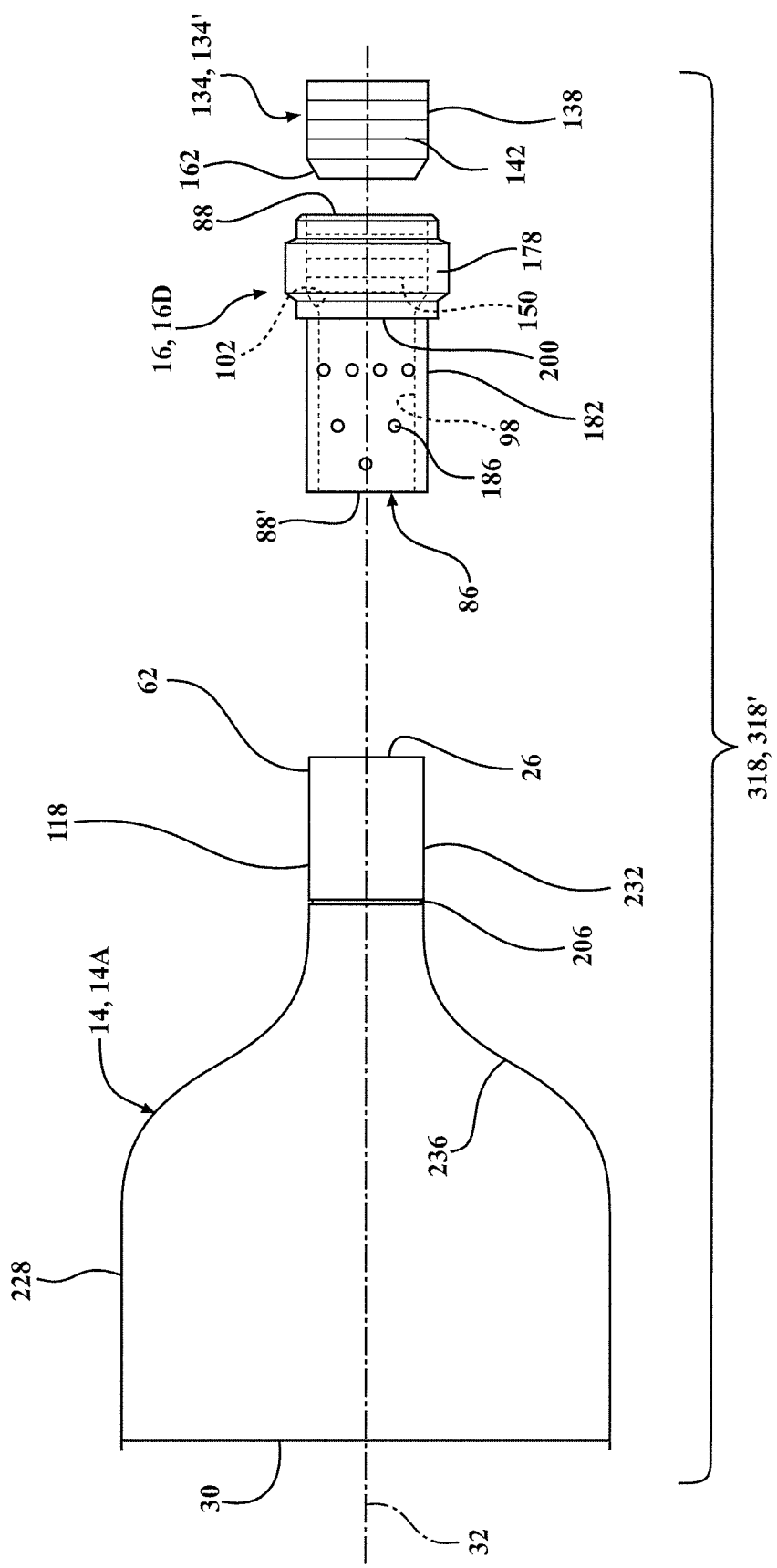
FIG. 18 is an exploded view of a liner/boss subassembly, according to one embodiment of the present invention.

Referring to FIGS. 14 and 15, the overall length of the spikes 186 can be selected based on the thickness of the outer composite shell 18, the nominal working pressure, or the expected amount of torque on the boss 16, the dimensions of the boss 16, and the number of spikes 186 attached to the shank 182. FIGS. 14 and 15 show enlarged views of portion C of the pressure vessel 10 shown in FIG. 13 illustrating variations in spike 186 length compared to the thickness of outer composite shell 18. Referring to FIG. 14, the outer composite shell 18 is shown as comprising an exemplary three fiber layers 224A-224C. The spike 186 of FIG. 16 extends through the first fiber layer 224A. In contrast, FIG. 18 shows the spike 186 having a length sufficient to penetrate through all three fiber layers 224A-224C. Various embodiments of the pressure vessel 10 can include more or less fiber layers 224A-224C than shown in FIGS. 14 and 15. Thus, the spikes 186 can be sized to project into and/or through any desired number of fiber layers 224A-224C, including both braided fiber layers 224 and wrapped fiber layers 218. Further, the spikes 186 can be embedded in and/or project through supplemental layers of materials between the liner 14 and the outer composite shell 18, including barrier layers, breather layers, metallic film layers, and the like.

Referring to FIGS. 10-15, the overall shape of the spikes 186, maximum outer diameter 186' of the spikes 186, contour of the spike tips 282, overall height of the spikes 186, circumferential distance between adjacent spikes 186, number of spikes 186, and arrangement of spikes 186 on the shank 182, and the like, are selected based in part on the expected rotational and axial forces on the boss 16, the method of applying fiber 214 to the liner 14, as well as based in part on dimensions of the shank 182, the outer composite shell 18, and the inclusion of supplemental layers between the liner 14 and the outer composite shell 18. For example, a greater number of spikes 186 having an increased overall length may be fixedly coupled to the shank 182 when elevated rotational and/or axial loads are expected on the boss 16 during use. For specific applications with lower expected rotational and axial loads on the boss 16, fewer and/or shorter spikes 186 may be selected.

The placement, shape, and overall dimensions of the spikes 186 are selected, based in part, on the over-braiding process 226 illustrated in FIG. 6. A conformable pressure vessel 10 is shown in FIG. 6 having a liner 14 with a larger diameter cylindrical section 228 that is connected to a smaller diameter cylindrical section 232 by a tapered cylindrical section 236. The flare edge 62 of the liner 14 has been previously fixedly coupled to the bore 86 of the boss 16 prior to the fibers 214 being over-braided around the liner 14. A plurality of fiber filaments 214 are grouped into a fiber strand 216. A plurality of fiber strands 216 are over-braided around the liner 14 using a braiding machine 226, as shown in FIG. 6. The braided fiber strands 216 conform to the outer surface 54 of the liner 14 with the density of the braided fiber strands 216 on the surface 54 of the liner 14 changing as the outer diameter of the liner 14 varies. The braided fiber strands 216 transition smoothly from the liner 14 to cover the shank 182 without affecting the over-braiding process 226.

Figure 17:
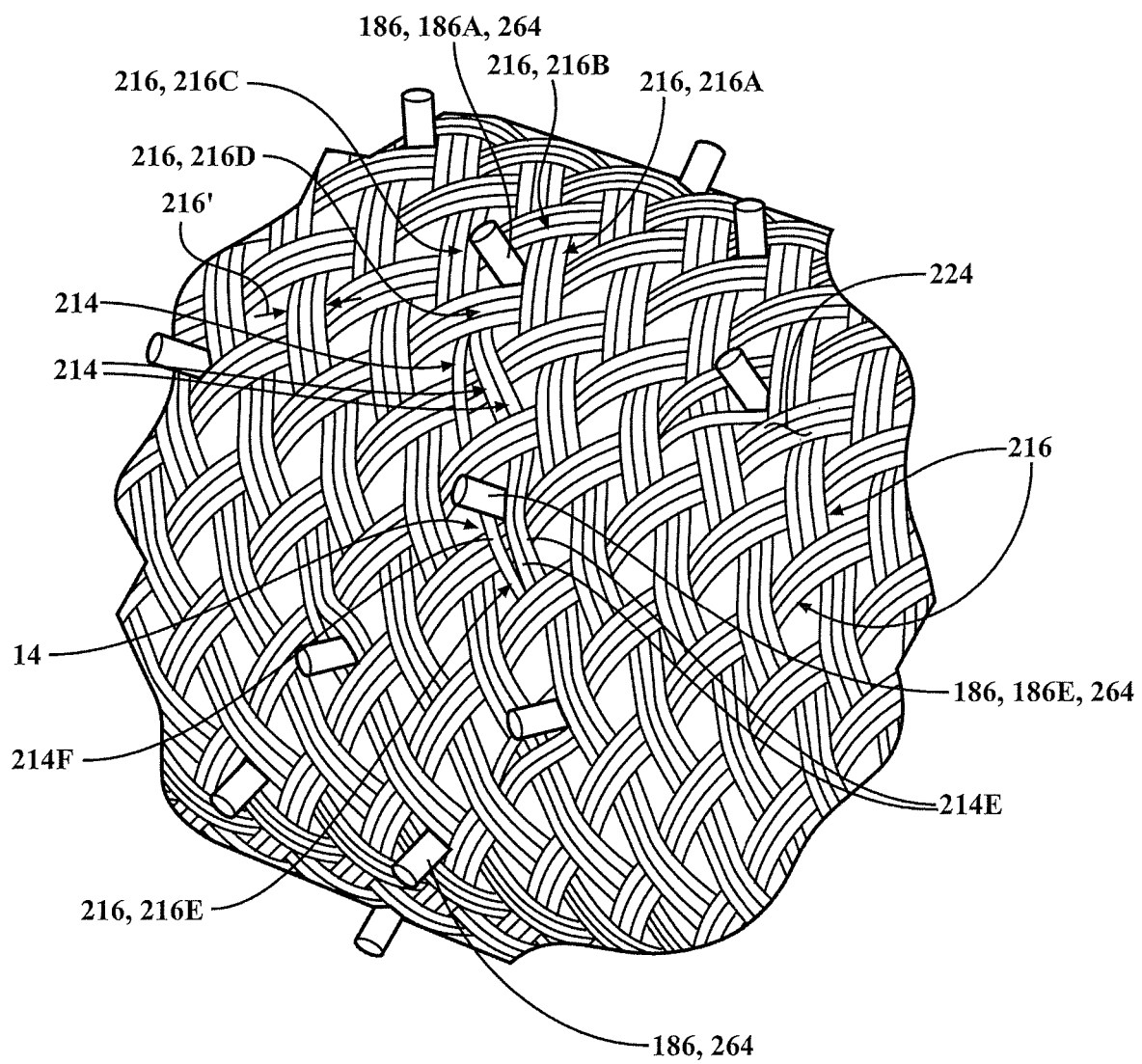
FIG. 17 illustrates a second embodiment of the portion B of the pressure vessel of FIG. 6, illustrating cylindrical-shaped spikes extending through the braided fiber strands of the outer composite shell.

The over-braiding process 226 can form the braided layer 224 of fiber strands 216 around the spikes 186 projecting from the shank 182, as illustrated in FIGS. 16 and 17. Each of FIGS. 16 and 17 show an enlarged view of portion B shown in FIG. 6. FIG. 16 illustrates tetrahedron-shaped spikes 268 and FIG. 17 illustrates cylindrical-shaped spikes 264. Referring to FIG. 16, each fiber strand 216 comprises a plurality of fiber filaments 214. The exemplary embodiment shown in FIG. 6 has shank 182 outer bearing surface 198 diameter of about 25 mm, the fiber strands 216 have a nominal strand width 216' of about 4 mm, and the outer composite shell 18 comprises a plurality of braided layers 224 of fiber strands 216 with the outer composite shell 18 being about 5 mm in thickness. However, the radial thickness of the outer composite shell 18 can be larger or smaller than about 5 mm if desired based on the boss diameter and on requirements of a specific application.

Referring to FIG. 16, preferably, the maximum outer diameter 186' of each spike 186 is less than the nominal strand width 216' of the fiber strands 216 used to faun the braided fiber layer 224. More preferably, the maximum outer diameter 186' of the spike main body 278 and of the spike tip 282 of each spike 186 is equal to or less than about half of the nominal strand width 216' of the fiber strands 216. Most preferably, the maximum outer diameter 186' of the spike tip 282 and of the spike main body 278 of each spike 186 is between about 0.2 mm and about 2.0 mm. The spike base 286 of each spike 186 can be larger than the above ranges if desired and further depending on the spike 186 attachment method to the shank 182. For example, spikes 186 attached to the shank 182 may have a flared base 286A larger than the spike main body 278 caused by a welding process. For spikes 186 having non-cylindrical shapes, such as the tetrahedron-shaped spikes 268, the pyramid-shaped spikes 270, and the like, the maximum outer dimensions 186' of the spike base 286 of each spike 186, 268, 270 is preferably equal to or less than the nominal strand width 216' of the fiber strands 216, more preferably equal to or less than half the nominal strand width 216' of the fiber strands 216, and most preferably between about 0.2 mm and about 2.0 mm. However, spikes 186 having larger and/or smaller diameters 186' may be selected for specific applications if desired.

Referring to FIGS. 10-15, preferably, the length of each spike 186 is between about 0.5 mm to about 5 mm, as measured between the spike tip 282 and the spike base 286. More preferably, the length of each spike 186 is sized to at least embed in a first fiber layer 224A that forms the outer composite shell 18, as shown in FIG. 14. However, each spike 186 can selectively have an overall length sufficient to penetrate any desired number of fiber layers 224, 224A-224C, 218, including both braided fiber layers 224 and wrapped fiber layers 218. Further, the length of the spikes 186 can be selected to penetrate optional supplemental layers such as one or more of a barrier layer, a breather layer, and the like, if desired for a specific application.

Adjacent spikes 186A, 186B shown in FIG. 16, are preferably spaced apart by at least one nominal strand width 216' of the fiber strand 216. The nominal strand width 216' of the fiber strand 216 is defined as an approximate width 216' of a fiber strand 216, as illustrated in FIG. 16. For the exemplary embodiment shown in FIG. 6 having a nominal width 216' of fiber strands 216 of about 4 mm, the preferred minimum spacing between adjacent spikes 186 is at least 4 mm, i.e. the preferred minimum spacing being equal or greater than the nominal strand width 216' of the fiber strands 216. Individual spikes 186 can be spaced closer together than the nominal strand width 216' of the fiber strands 216 as long as the minimum distance between adjacent spike tips 282 is preferably equal or greater than the nominal strand width 216' of the fiber strands 216. The number of spikes 186 can be as few as about four with a maximum amount of spikes 186 determined by the outer diameter and length of the shank 182 while positioning the spikes 186 at least a nominal strand width 216' of the fiber strands 216 apart. Further, when the boss 16 includes a plurality of rows 294, 294' of spikes 186, preferably adjacent rows 294, 294' are spaced at least one nominal strand width 216' of the fiber strands 216 apart.

The fiber strands 216 are braided around the spikes 186, such as illustrated by relative positions of fiber strands 216A-216D and spike 186A, as shown in FIGS. 16 and 17. When fiber strands 216, 216E align with the spikes 186, such as illustrated by fiber strand 216E and spike 186E shown in FIGS. 16 and 17, some of the fiber filaments 214 of the fiber strands 216E will be laid down around the spikes 186E, e.g., the fiber strand 216E is split into groups of filaments 214 as illustrated by 214E and 214F. The engagement between the fiber strands 216A-216E and the spikes 186, 186A, 186E interlock the braided fiber layer 224A with the spikes 186, 186A, 186E. Additional braided fiber layers 224B, 224C will interlock with the spikes 186, 186A, 186E in a similar method. Each braided fiber layer 224A-224C that is braided around the spikes 186, 186A, 186E will increase the strength of the mechanical connection between the boss 16 and the outer composite shell 18. The mechanical connection between the boss 16 and the outer composite shell 18 is further strengthened by the curing of the resin 220 impregnated into the fiber strands 216, 216A-216E. The fiber strands 216, 216A-216E will be similarly interlocked with the spikes 186, 186A, 186E when the fiber strands 216, 216A-216E are helically wrapped around the shank 182 forming wrapped fiber layers 218.

FIGS. 18-23 illustrate a method of continuous manufacturing of pressure vessels 10, particularly conformable pressure vessels 10 with over-braided outer composite shells 18. An exploded view of a liner/boss subassembly 318, 318' is shown in FIG. 18. The liner/boss subassembly 318, 318' comprises a liner 14, 14A a boss 16, 16D and a sealing insert 134, 134'. The longitudinal axis of the liner/boss subassembly 318, 318' is shown by element 32 in FIG. 18. The liner 14, 14A optionally includes a locating feature 206 integrated into the cylindrical neck region 118 of the liner 14, 14A for locating the boss 16, 16D during assembly. The locating feature 206 can include a recessed channel, a ridge, protrusions, and the like as non-limiting examples. The shank 182 of the boss 16, 16D is slid over the liner 14, 14A such that the flare edge 62 of the liner 14, 14A is inserted into the bore 86 of the boss 16, 16D until the terminal end 88' of the boss 16, 16D engages with the locating feature 206 on the liner 14, 14A. The sealing insert 134, 134' is assembled with the bore 86 of the boss 16, 16D such that the cone surface 162 of the sealing insert 134, 134' pinches the liner 14, 14A against the boss cone surface 102 of the bore 86. Assembling the boss 16, 16D, the liner 14, 14A and the sealing insert 134, 134' forms the liner/boss subassembly 318, 318' illustrated in FIG. 19.

Figure 19:
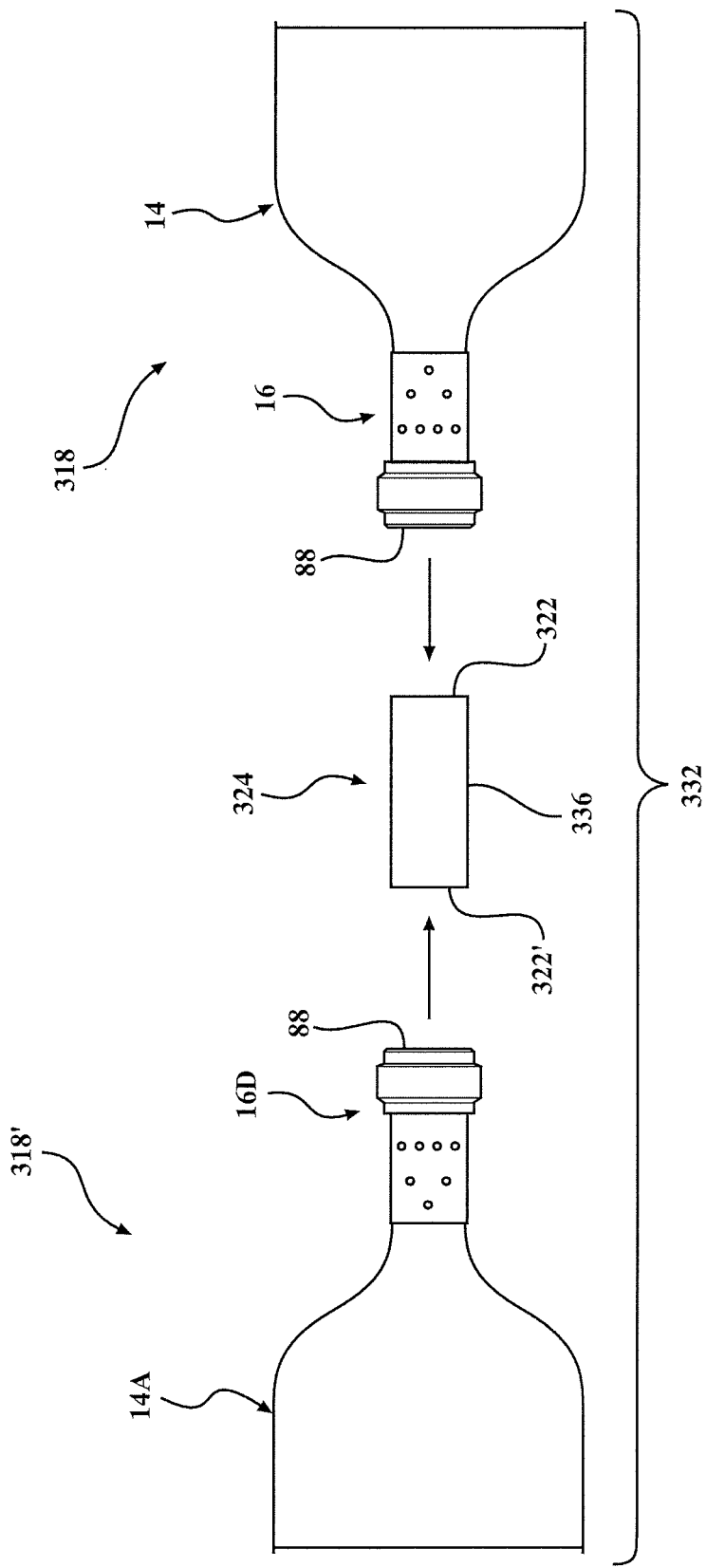
FIG. 19 is an exploded view of an elongated subassembly comprising a pair of liner/boss subassemblies of FIG. 18 and a sacrificial tubing section, according to one embodiment of the present invention.
Figure 20:
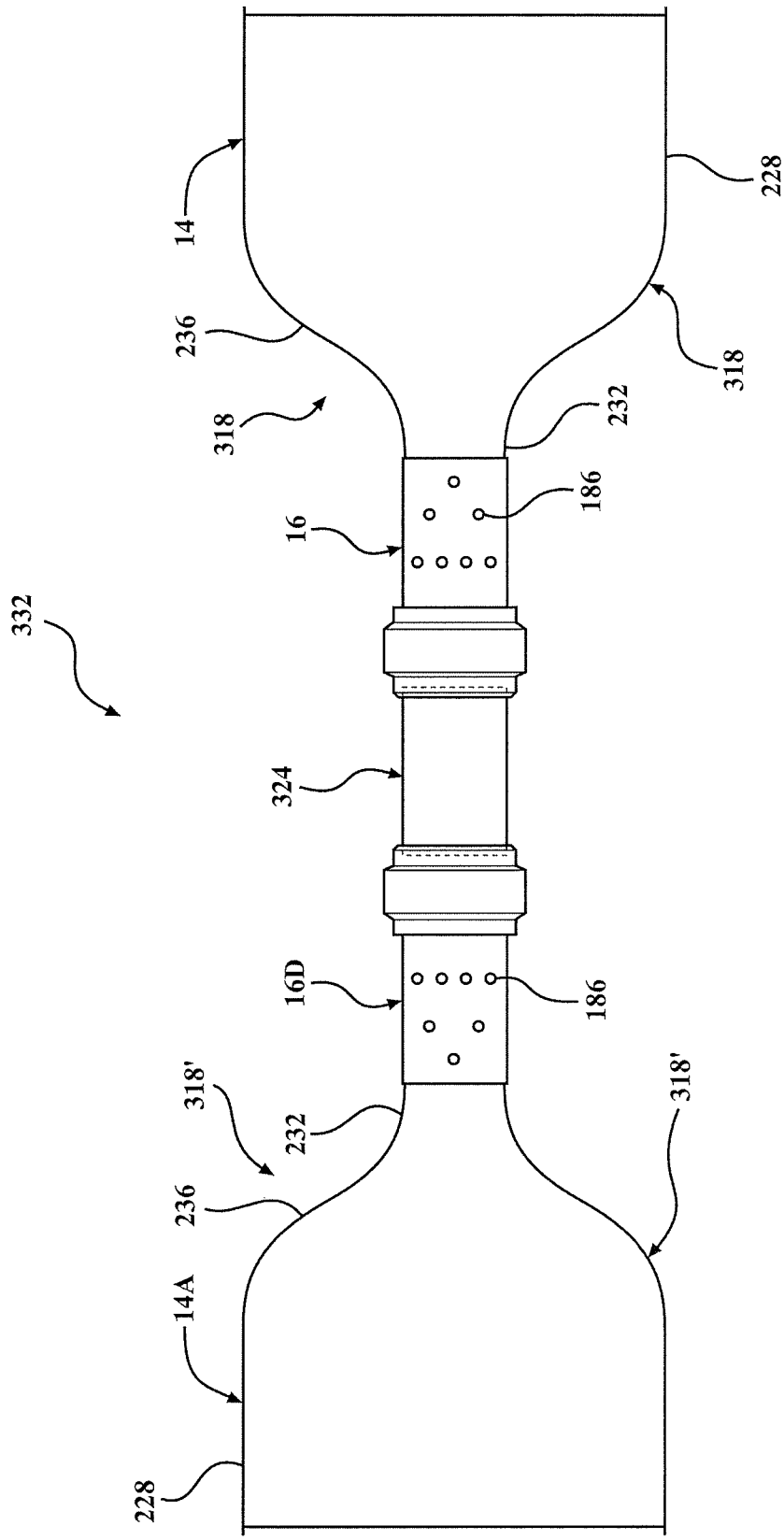
FIG. 20 is a perspective view of the elongated subassembly of FIG. 19.

Referring to FIG. 19, a liner/boss subassembly 318, 318' is fastened to each terminal end 322, 322' of a sacrificial tubing section 324 to form an elongated subassembly 332. The sacrificial tubing section 324 is defined by a cylindrical wall 336 extending between the opposing terminal ends 322, 322'. Further, the terminal end 88 of each boss 16, 16D and the terminal ends 322, 322' of the sacrificial tubing section 324 are configured to matingly engage and fixedly couple and/or releasably couple the liner/boss subassemblies 318, 318' to the sacrificial tubing section 324. FIG. 20 illustrates the elongated subassembly 332 of a pair of liner/boss subassemblies 318, 318' coupled to the opposing terminal ends 322, 322' of the sacrificial tubing section 324. Any number of liners/boss subassemblies 318, 318' can be coupled together with sacrificial tubing section 324 to form the elongated assembly 332 prior to passing the liner/boss subassemblies 318, 318' through one or more braiding machines 226.

Figure 21:
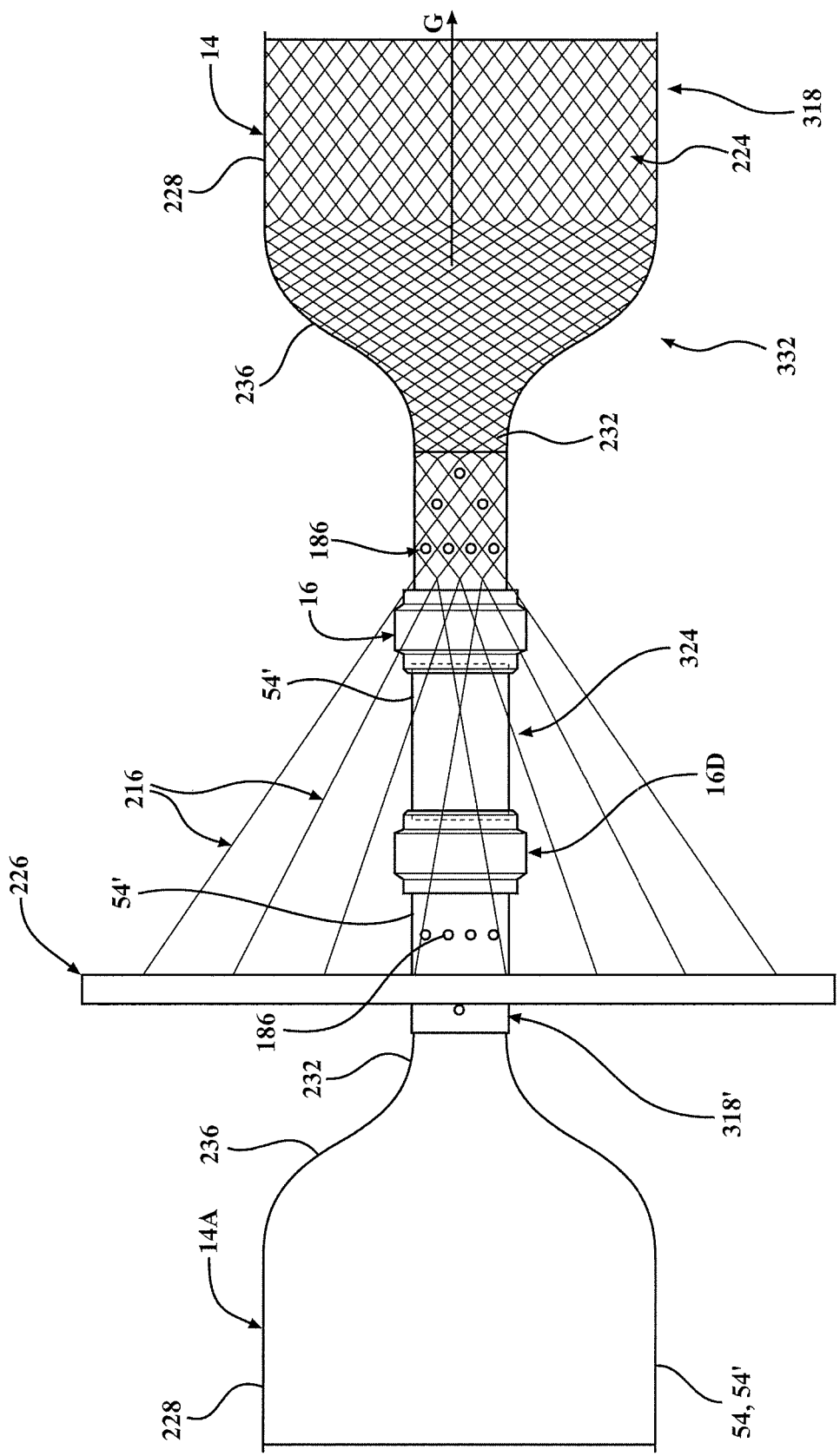
FIG. 21 is a perspective view of the elongated subassembly of FIG. 19 being passed through the braiding machine of FIG. 6.

FIG. 21 illustrates a process of feeding the elongated assembly 332 through a braiding machine 226, as illustrated by arrow G. Each liner 14, 14A includes one or more larger diameter cylindrical sections 228, smaller diameter cylindrical sections 232, and tapered liner sections 236 extending between adjacent larger and smaller diameter sections 228, 232. The braiding machine 226 over-braids a plurality of fiber strands 216 around the outer periphery 54' of the liner 14, 14A. The braiding process 226 automatically braids the fiber strands 216 over the outer periphery 54' of the elongated assembly 332 with the braided fiber layer 224 following the outer contour 54, 54' of the liner 14. As the elongated assembly 332 passes through the braiding machine 226, fiber strands 216 are braided around the outer periphery 54, 54' of the liner 14, 14A the boss 16, 16D and the sacrificial tubing section 324 as these components 14, 14A, 16, 16D, 324 pass through the braiding machine 226. The elongated assembly 332 can be passed sequentially through a plurality of braiding machines 226 with each braiding machine 226 configured to over-braid a single layer 224 of braided fiber strands 216.

The elongated assembly 332 can be wrapped with one or more of barrier layers, breather layers, metallic film layers, and the like, prior to over-braiding fiber strands 216 around the elongated assembly 332. Further, one or more of barrier layers, breather layers, metallic film layers, and the like, can be applied to the elongated assembly 332 after and/or before over-braiding individual fiber layers 224, 224A-224C. As a non-limiting example, a breather layer can be wrapped around the entire elongated assembly 332 prior to over-braiding a first fiber layer 224, 224A around the outer periphery 54' of the elongated assembly 332. As another example, a metallic film layer can be wrapped around the liner 14, 14A around the outer periphery 54' of the first braided fiber layer 224A followed by over-braiding additional fiber layers 224B, 224C around the elongated assembly 332.

Figure 22:
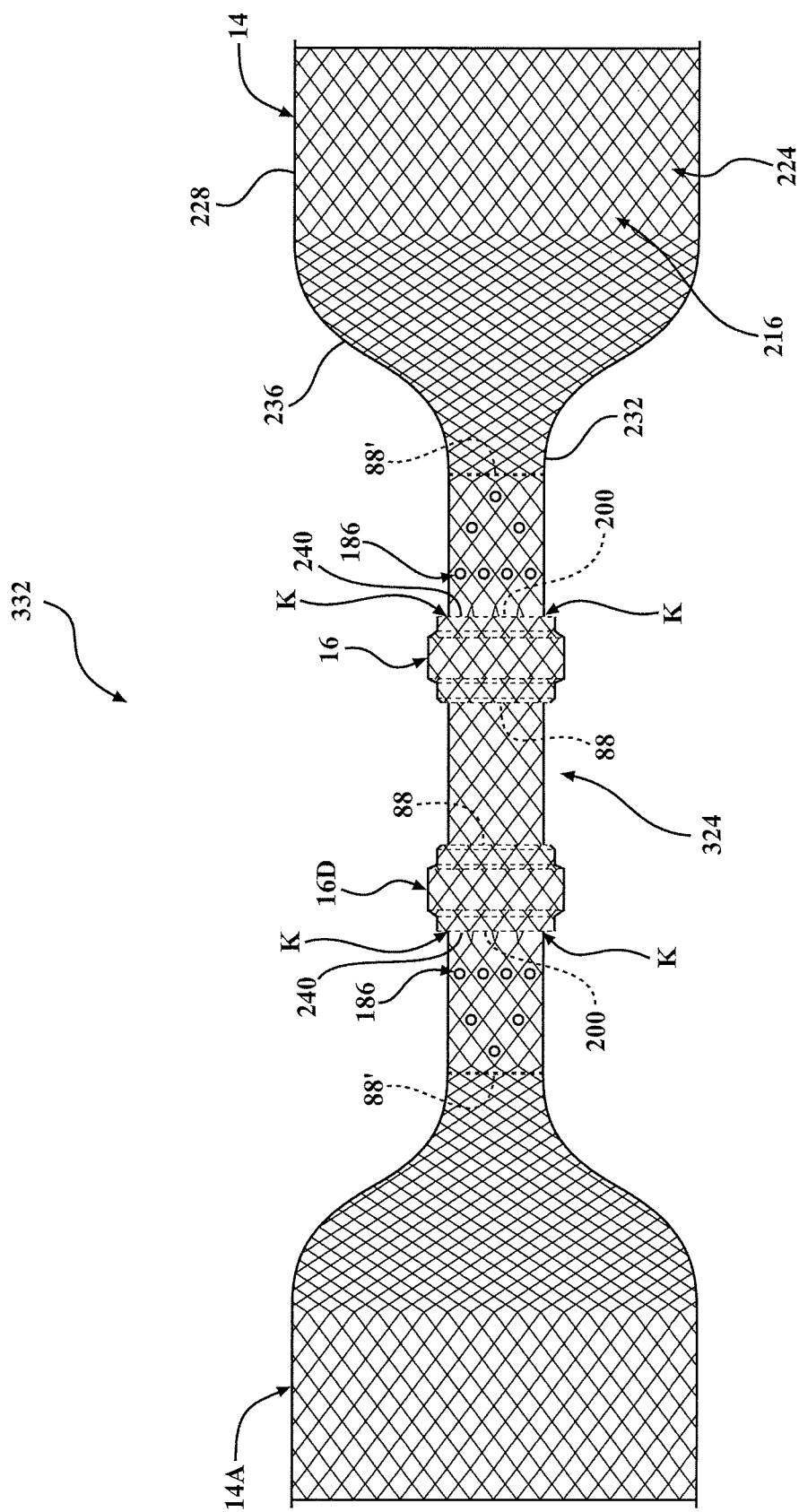
FIG. 22 is a perspective view of the elongated subassembly of FIG. 19 that has been over-braided with a plurality of fiber strands.
Figure 23:
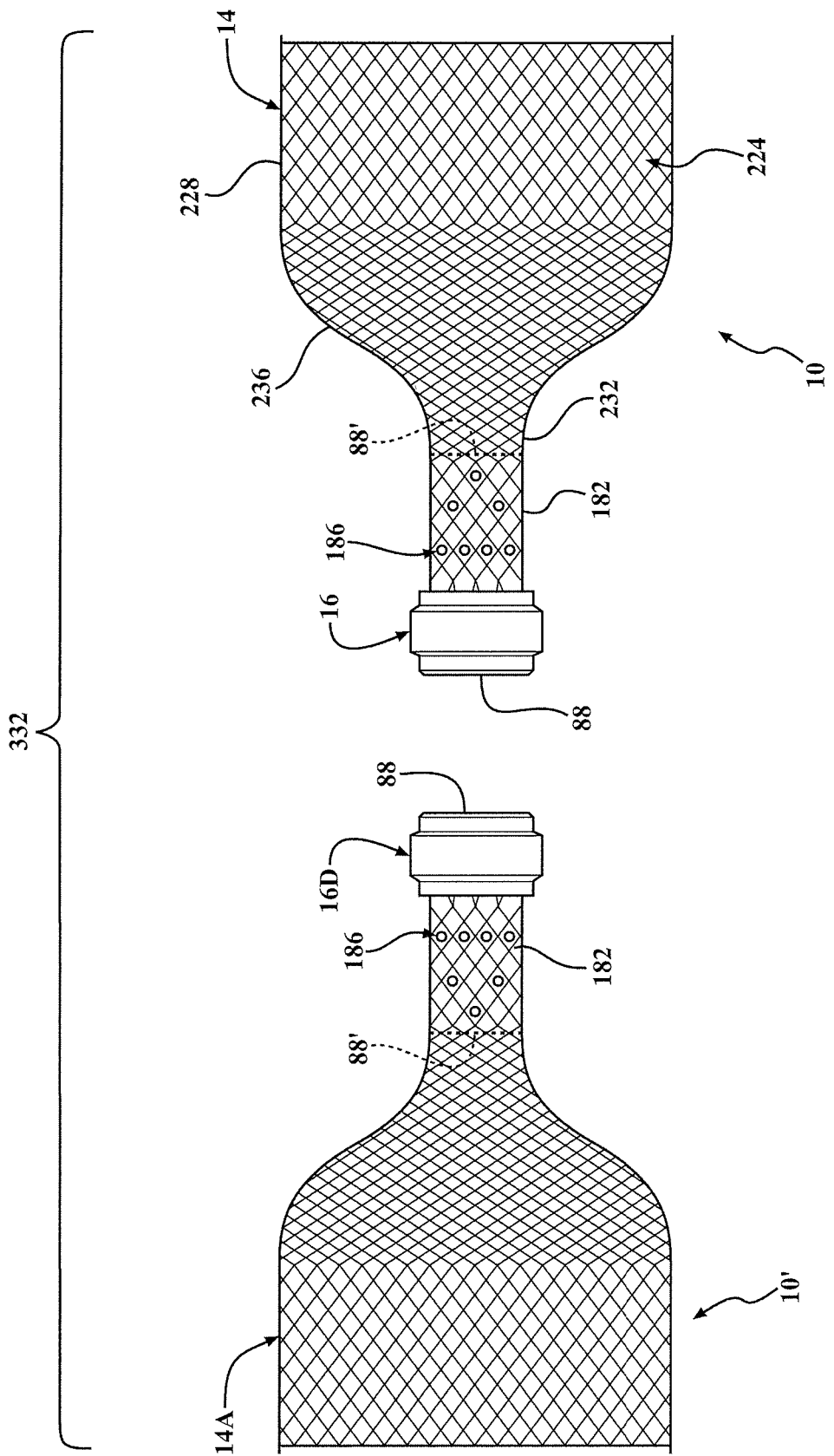
FIG. 23 is a perspective view of the elongated subassembly of FIG. 22 after trimming of the braided fiber strands and removal of the sacrificial tubing section.

FIG. 22 illustrates the elongated assembly 332 after passing through the braiding machine 226 and before the braided fiber layer 224 is trimmed adjacent the flange shoulder 200 of each boss 16, 16D. As shown in FIG. 22, the entire elongated assembly 332 is over-braided with the fiber strands 216. The braided fiber layer 224 is trimmed (as illustrated by arrows K shown in FIG. 22) adjacent the flange shoulder 200 of each boss 16, 16D to form a composite free edge 240. The sacrificial tubing section 324 is removed from each boss 16, 16D after the braided fiber layer 224 is trimmed. FIG. 23 shows the elongated assembly 332 after trimming to form separate pressure vessels 10, 10'. The composite free edge 240 on each boss 16, 16D can be covered with tape 242 and/or a crimped ferrule if desired.

One benefit of a pressure vessel 10 having a liner 14 fixedly coupled to a boss 16 having spikes 186 projecting outward from the boss 16 embedded in an outer composite shell 18 is the boss 16 is mechanically coupled directly to the outer composite shell 18 as well as mechanically coupled to the liner 14. A second benefit is a seal is achieved between the liner 14 and the boss 16 by fixedly coupling the liner 14 to a boss cone surface 102 of a bore 86 passing axially through the boss 16. A third benefit is the embedded spikes 186 in the outer composite shell 18 restrict rotation of the boss 16 with respect to the outer composite shell 18. A fourth benefit is the embedded spikes 186 in the outer composite shell 18 restrict axial motion of the boss 16 with respect to the outer composite shell 18 since the boss 16 and the outer composite shell 18 are mechanically coupled by the spikes 186. A fifth benefit is fixedly coupling the liner 14 to the boss 16 without using a molding process and without using a ferrule to crimp the liner 14 to the boss 16. A sixth benefit is fixedly coupling the outer composite shell 18 to the boss 16 without relying on a ferrule to crimp the outer composite shell 18 to the boss 16.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A pressure vessel for containing liquids and/or gases under pressure, said pressure vessel comprising:
   a polymeric liner comprising a hollow body defined by an elongated cylindrical wall having opposing inner and outer surfaces extending between a first terminal end and a second terminal end of said liner, said liner including an inlet opening near said first terminal end of said liner, said inlet opening defined by a flare edge of said liner;
   an outer composite shell comprising resin and fibers, said outer composite shell surrounding an outer periphery of said liner;
   a boss having a bore passing axially through said boss, said bore defined by a cylindrical wall having an interior surface, said bore in fluid communication with an interior of said pressure vessel;
   said boss having a shank with opposing inner and outer bearing surfaces, said inner bearing surface oriented towards said outer surface of said liner, and said outer bearing surface oriented towards said outer composite shell;
   said shank including a plurality of spikes fixedly coupled to said shank and projecting radially away from said outer bearing surface, each of said plurality of spikes being at least partially embedded into said outer composite shell;
   said flare edge of said polymeric liner being fixedly coupled to said boss;
   said outer composite shell formed by braiding a plurality of fiber strands around said liner and said shank of said boss to form a layer of braided fiber strands;
   each of said plurality of fiber strands comprises a plurality of fiber filaments, said each of said plurality of fiber strands having a nominal strand width; and
   each pair of adjacent spikes having respective spike tips being spaced apart by at least said nominal strand width.

2. The pressure vessel as set forth in claim 1, wherein:
   said plurality of spikes comprises four or more spikes.

3. The pressure vessel as set forth in claim 2, wherein:
   said plurality of spikes being distributed across at least one zone on said outer surface of said shank.

4. The pressure vessel as set forth in claim 3, wherein:
   said plurality of spikes being distributed across two or more zones on said outer surface of said shank; and
   said two or more zones being spaced apart on said outer periphery of said shank.

5. The pressure vessel as set forth in claim 2, wherein:
at least a first portion of said plurality of spikes forming a first row of spikes spaced around an outer periphery of said shank.

6. The pressure vessel as set forth in claim 5, wherein:
a second portion of said plurality of spikes forms a second row of spikes spaced around said outer periphery of said shank; and
said second row of spikes being spaced apart from said first row of spikes in an axial direction of said boss.

7. The pressure vessel as set forth in claim 6, wherein:
each spike of said second row of spikes being circumferentially offset from said spikes of said first row of spikes.

8. The pressure vessel as set forth in claim 5, wherein:
a second portion of said plurality of spikes form a second row of spikes spaced around said outer periphery of said shank;
said second row of spikes being spaced apart from said first row of spikes in an axial direction of said boss; and
said first row of spikes and said second row of spikes being spaced apart by an axial distance of said boss of at least said nominal strand width.

9. The pressure vessel as set forth in claim 5, wherein:
said boss including a flange shoulder formed on an outer portion of said boss; and
said flange shoulder abutting said outer composite shell.

10. The pressure vessel as set forth in claim 5, wherein:
each spike of said plurality of spikes having a spike main body defined between a spike base and a spike tip of said spike, said spike base being fixedly coupled to said shank;
said spike tip of each spike of said plurality of spikes having a maximum width of less than said nominal strand width; and
said spike main body of each spike of said plurality of spikes having a maximum width of less than said nominal strand width.

11. The pressure vessel as set forth in claim 10, wherein:
each spike of said plurality of spikes having a maximum cross-sectional width between about 0.2 mm and about 2.0 mm.

12. The pressure vessel as set forth in claim 11, wherein:
each spike of said plurality of spikes having a spike length defined between said spike base and said spike tip, said spike length being between about 0.5 mm to about 5 mm.

13. The pressure vessel as set forth in claim 12, wherein said spike base of each spike of said plurality of spikes being welded and/or adhered to said shank of said boss.

14. The pressure vessel as set forth in claim 12, wherein each spike of said plurality of spikes being press-fit into holes in said shank of said boss.

15. The pressure vessel as set forth in claim 14, wherein at least one spike of said plurality of spikes includes a pin projecting axially away from said spike base, said pin configured to be press-fitted into holes in said shank of said boss.

16. The pressure vessel as set forth in claim 12, wherein at least one spike of said plurality of spikes being a cylindrical-shaped spike.

17. The pressure vessel as set forth in claim 12, wherein at least one spike of said plurality of spikes being a tetrahedron-shaped spike.

18. The pressure vessel as set forth in claim 12, wherein at least one spike of said plurality of spikes being a pyramid-shaped spike having four or more lateral faces.

19. The pressure vessel as set forth in claim 12, wherein at least one spike of said plurality of spikes being a conical-shaped spike.

20. The pressure vessel as set forth in claim 12, wherein at least one of said plurality of spikes has a rounded spike tip.

21. A pressure vessel for containing liquids and/or gases under pressure, said pressure vessel comprising:
a polymeric liner comprising a hollow body defined by an elongated cylindrical wall having opposing inner and outer surfaces extending between a first terminal end and a second terminal end of said liner, said liner including an inlet opening near said first terminal end of said liner, said inlet opening defined by a flare edge of said liner;
an outer composite shell comprising resin and fibers, said outer composite shell surrounding an outer periphery of said liner;
a boss having a bore passing axially through said boss, said bore defined by a cylindrical wall having an interior surface, said bore in fluid communication with an interior of said pressure vessel;
said boss having a shank with opposing inner and outer bearing surfaces, said inner bearing surface oriented towards said outer surface of said liner, and said outer bearing surface oriented towards said outer composite shell;
said shank including a plurality of spikes fixedly coupled to said shank and projecting radially away from said outer bearing surface, each of said plurality of spikes being at least partially embedded into said outer composite shell;
said flare edge of said polymeric liner being fixedly coupled to said boss;
said flare edge of said polymeric liner extending axially into said bore of said boss to form a profiled neck;
said liner being fixedly coupled to said interior surface of said bore of said boss;
said bore of said boss including an inner cylindrical neck portion formed on said interior surface of said boss and a boss cone surface formed on said interior surface of said boss adjacent said inner cylindrical neck portion; and
said flare edge of said polymeric liner extending axially into said bore of said boss to form said profiled neck, said profiled neck of said liner including a cylindrical neck region that bends outward to form a cone-shaped flare edge that substantially conforms to said inner cylindrical neck portion and said boss cone surface of said boss.

22. The pressure vessel as set forth in claim 21, said pressure vessel including a sealing insert shaped to fit within and engage with said bore of said boss, said sealing insert having a cone surface configured to matingly engage with said boss cone surface;
wherein when said sealing insert is engaged with said bore of said boss, said flare edge of said liner is radially compressed between said cone surface of said sealing insert and said boss cone surface of said boss.

23. The pressure vessel as set forth in claim 22, wherein said boss cone surface has one or more ridges extending across said boss cone surface.

24. The pressure vessel as set forth in claim 22, wherein at least a portion of said boss cone surface has a rough surface texture.

25. The pressure vessel as set forth in claim 22, wherein at least a portion of said boss cone surface has a smooth surface.

26. The pressure vessel as set forth in claim 22, wherein:
said sealing insert being fixedly coupled to said boss by a crimped joint and/or press-fit joint.

27. The pressure vessel as set forth in claim 22, wherein:
said sealing insert being coupled to said bore of said boss by a threaded joint.

* * * * *